US012743615B2

(12) United States Patent
Kanazawa et al.

(10) Patent No.: US 12,743,615 B2
(45) Date of Patent: Sep. 22, 2026

(54) METHOD, DEVICE, AND COMPUTER PROGRAM FOR GENERATING EVIDENCE IMAGE CORRESPONDING TO SIMILARITY DEGREES OF IMAGES

(71) Applicant: SEIKO EPSON CORPORATION, Tokyo (JP)

(72) Inventors: Kana Kanazawa, Shiojiri (JP); Hikaru Kurasawa, Matsumoto (JP); Ryoki Watanabe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1117 days.

(21) Appl. No.: 17/535,256

(22) Filed: Nov. 24, 2021

(65) Prior Publication Data

US 2022/0164658 A1 May 26, 2022

(30) Foreign Application Priority Data

Nov. 25, 2020 (JP) ................................ 2020-194805

(51) Int. Cl.
*G06N 3/08* (2023.01)
*G06N 3/048* (2023.01)
(Continued)

(52) U.S. Cl.
CPC ............... *G06N 3/08* (2013.01); *G06N 3/048* (2023.01); *G06V 10/761* (2022.01); *G06V 10/82* (2022.01)

(58) Field of Classification Search
CPC ........ G06V 10/761; G06V 10/82; G06N 3/08; G06N 3/048; G06N 3/045; G06N 3/0464; G06N 3/09
See application file for complete search history.

(56) References Cited

U.S. PATENT DOCUMENTS 11,811,984 B2 * 11/2023 Kosaka .................... G06N 3/08
2021/0097132 A1 * 4/2021 Dimanov ............. G06N 3/0464
2022/0076052 A1 * 3/2022 Zhang .................... G06N 3/045

FOREIGN PATENT DOCUMENTS

WO WO-2019083553 A1 * 5/2019 ............ G06F 17/16

OTHER PUBLICATIONS

R. R. Selvaraju, M. Cogswell, A. Das, R. Vedantam, D. Parikh and D. Batra, "Grad-CAM: Visual Explanations from Deep Networks via Gradient-Based Localization," 2017 IEEE International Conference on Computer Vision (ICCV), Venice, Italy, 2017, pp. 618-626, doi: 10.1109/ICCV.2017.74. (Year: 2017).*

(Continued)

*Primary Examiner* — Matthew Ell
*Assistant Examiner* — Jonathan J Kim
(74) *Attorney, Agent, or Firm* — Oliff PLC

(57) ABSTRACT

A method causes one or more processors to execute a method in which a machine learning model of a vector neural network type is used. The model is learned to reproduce correspondence between first images and a pre-label corresponding to each of the first images, and includes one or more neuron layers. First intermediate data output by the one or more neurons when the first images are input to the learned model is stored in one or more memories in correlation with the neurons. The method includes inputting a second image of an object to the machine learning model and acquiring second intermediate data based on at least one of a second vector and a second activation included in the one or more neurons, calculating a similarity degree between the first and second intermediate data, generating an evidence image corresponding to the similarity degree, and displaying the generated evidence image.

7 Claims, 18 Drawing Sheets

(51) Int. Cl.
*G06V 10/74* (2022.01)
*G06V 10/82* (2022.01)

(56) References Cited

OTHER PUBLICATIONS

Strong, G., & Gong, M. (2011). Similarity-based image organization and browsing using multi-resolution self-organizing map. Image and Vision Computing, 29(11), 774-786. https://doi.org/10.1016/j.imavis.2011.08.007 (Year: 2011).*

D. Scharstein, "Matching images by comparing their gradient fields," Proceedings of 12th International Conference on Pattern Recognition, Jerusalem, Israel, 1994, pp. 572-575 vol. 1, doi: 10.1109/ICPR.1994.576363. (Year: 1994).*

Selvaraju, Ramprasaath R., et al. "Grad-cam: Visual explanations from deep networks via gradient-based localization." Proceedings of the IEEE international conference on computer vision. 2017. (Year: 2017).*

Selvaraju et al. "Grad-CAM: Visual Explanations from Deep Networks via Gradient-based Localization" [online], Cornell University <URL: https://arxiv.org/abs/1610.02391>.

* cited by examiner

FIG. 1

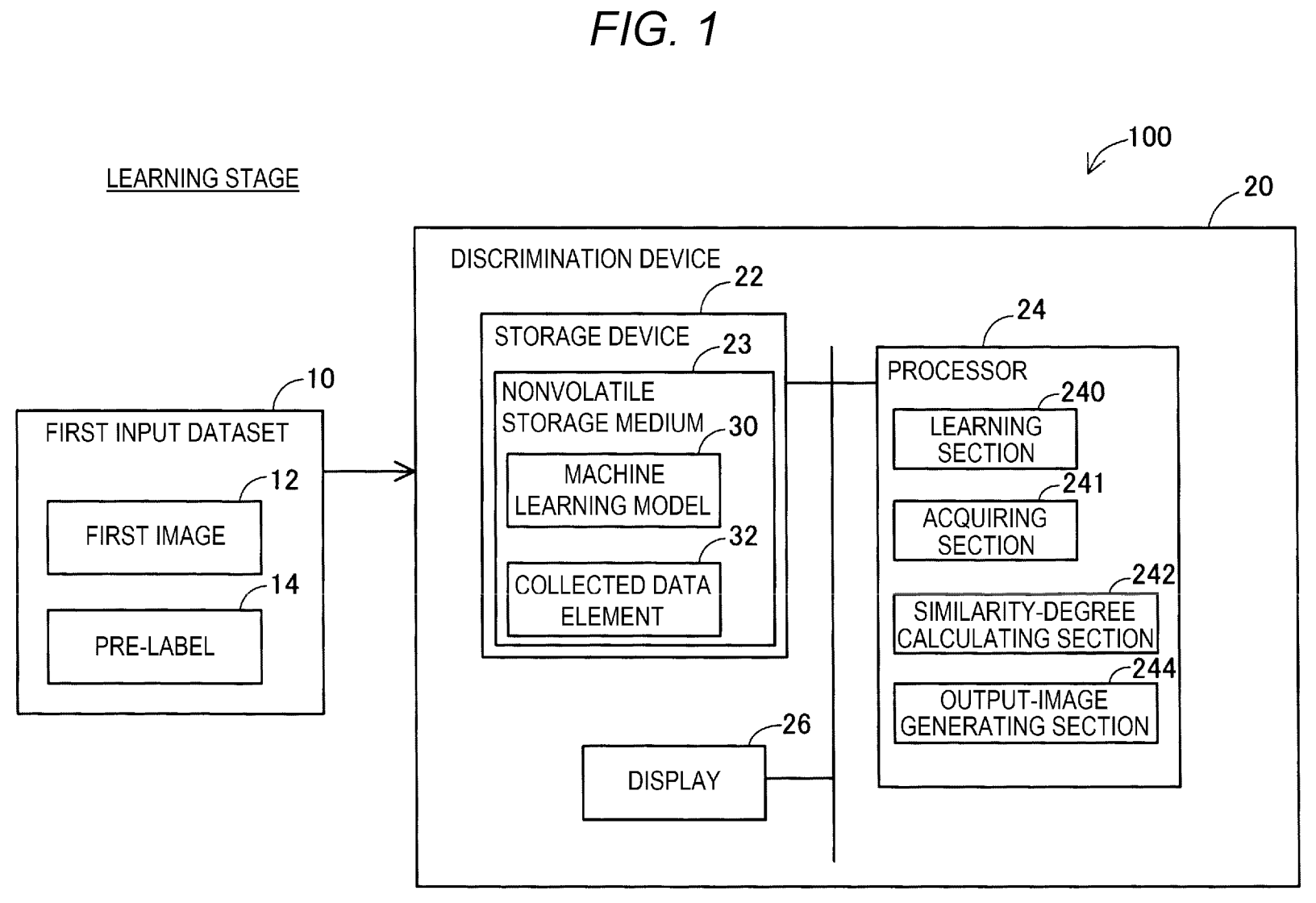

LEARNING STAGE
100
20
DISCRIMINATION DEVICE
22
STORAGE DEVICE
23
NONVOLATILE STORAGE MEDIUM
30
MACHINE LEARNING MODEL
32
COLLECTED DATA ELEMENT
24
PROCESSOR
240
LEARNING SECTION
241
ACQUIRING SECTION
242
SIMILARITY-DEGREE CALCULATING SECTION
244
OUTPUT-IMAGE GENERATING SECTION
26
DISPLAY
10
FIRST INPUT DATASET
12
FIRST IMAGE
14
PRE-LABEL

FIG. 5

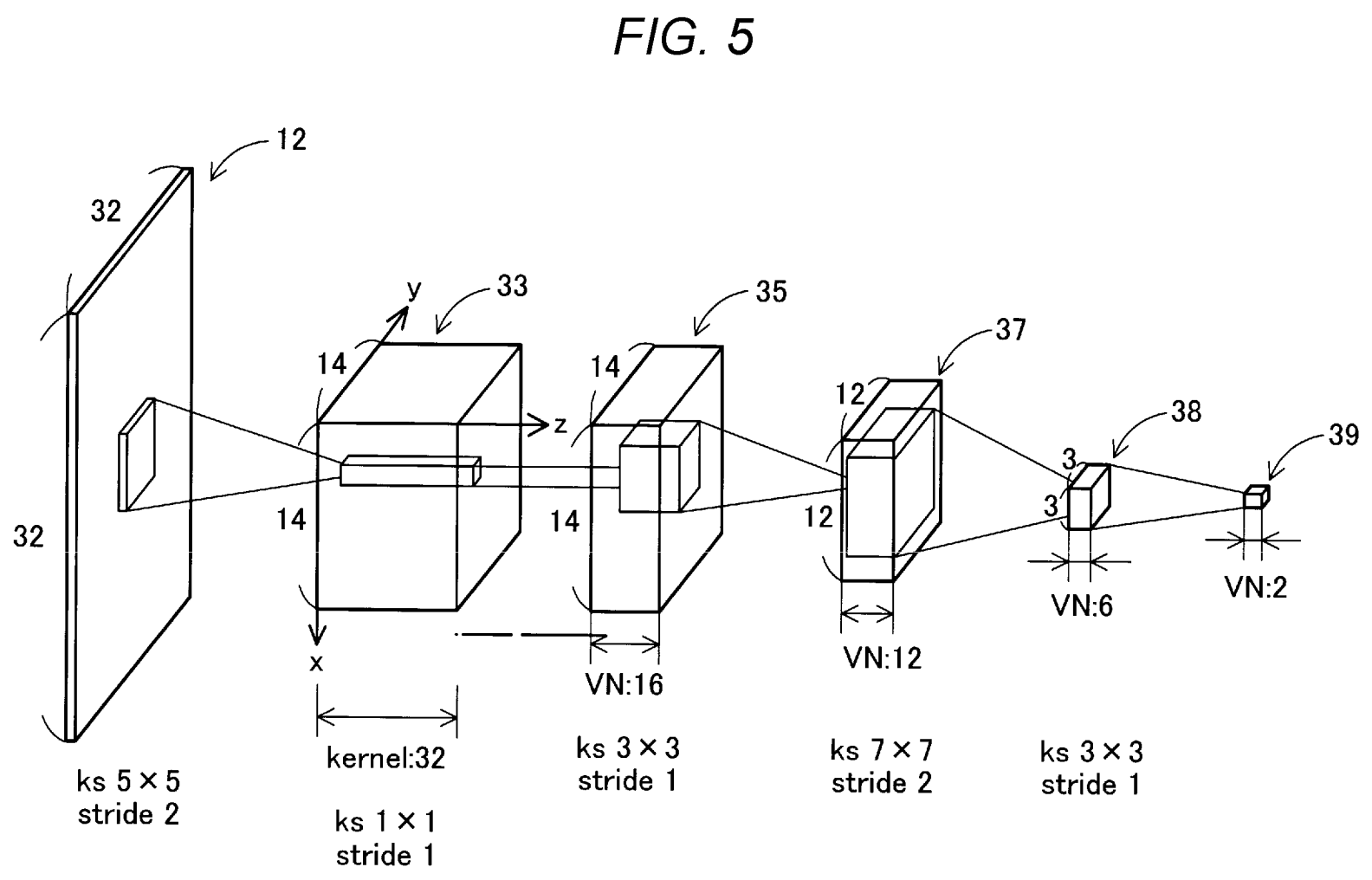

12
32
32
ks 5×5
stride 2
33
14
14
y
x
z
kernel:32
ks 1×1
stride 1
35
14
14
VN:16
ks 3×3
stride 1
37
12
12
VN:12
ks 7×7
stride 2
38
3
3
VN:6
ks 3×3
stride 1
39
VN:2

Figure 7:
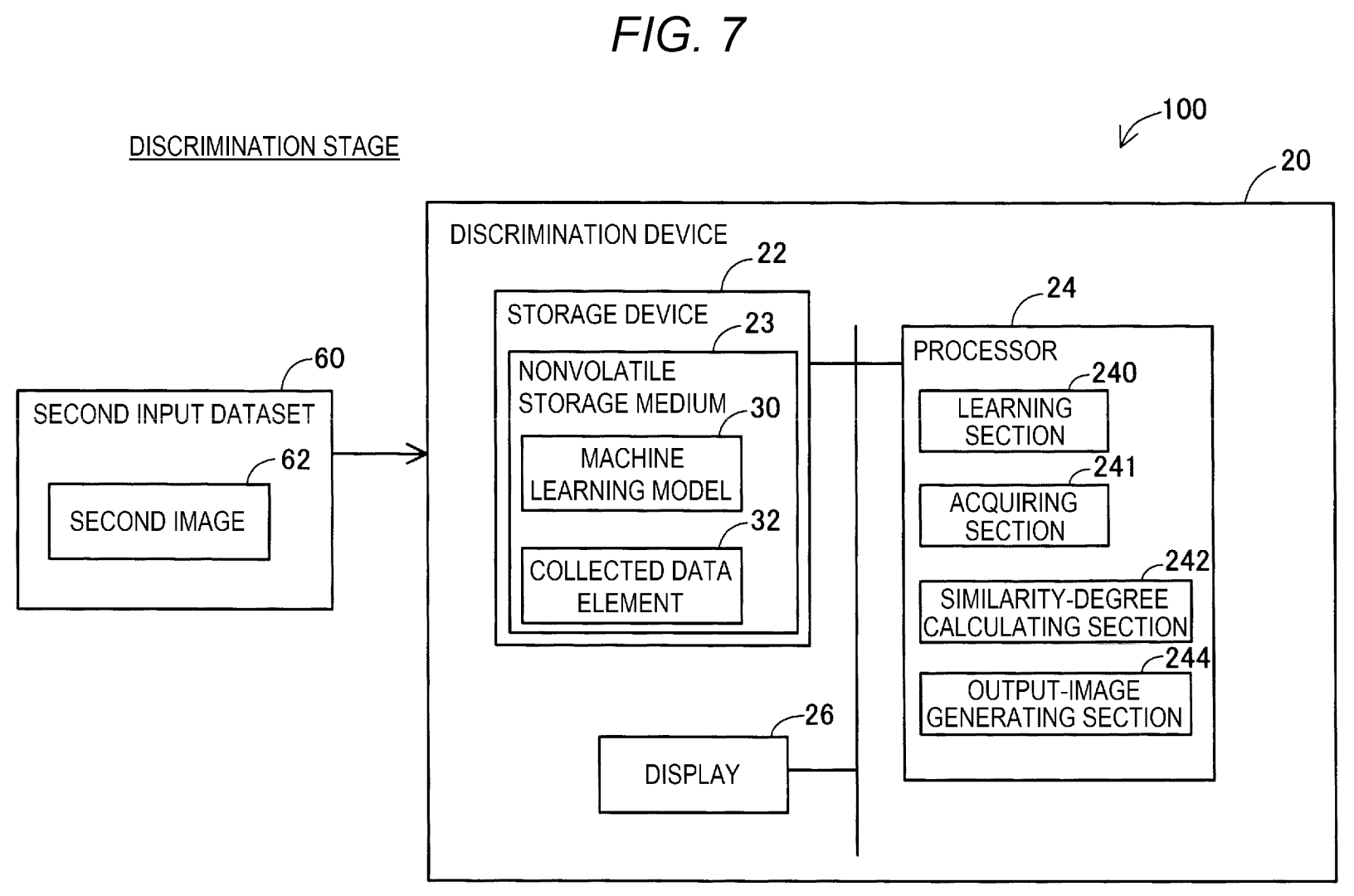

DISCRIMINATION STAGE

60
SECOND INPUT DATASET
62
SECOND IMAGE

20
DISCRIMINATION DEVICE
22
STORAGE DEVICE
23
NONVOLATILE STORAGE MEDIUM
30
MACHINE LEARNING MODEL
32
COLLECTED DATA ELEMENT

24
PROCESSOR
240
LEARNING SECTION
241
ACQUIRING SECTION
242
SIMILARITY-DEGREE CALCULATING SECTION
244
OUTPUT-IMAGE GENERATING SECTION

26
DISPLAY

IMP
IM0
IM1
IM2
IM3
IM3a
IM3b
IM4
DISCRIMINATION TARGET DATA
CORRECT ANSWER DATA
FIRST DISCRIMINATION EVIDENCE (LOCAL SHAPE)
SECOND DISCRIMINATION EVIDENCE (RELATIVE POSITION)
DISCRIMINA-TION RESULT
IM11
IM12
PIMEA,PIME
IMEA,IME
IR
PIMEB,PIME
IMEB,IME
IR
IM14
DEFECTIVE PRODUCT
IM11
IM12
PIMEA,PIME
IMEA,IME
IR
PIMEB,PIME
IMEB,IME
IR
IM14
NON-DEFECTIVE PRODUCT

IMP
IM0a
IM1
IM2
IM3
IM3a
IM3b
IM4
DISCRIMINATION TARGET DATA
CORRECT ANSWER DATA
FIRST DISCRIMINATION EVIDENCE (LOCAL SHAPE)
SECOND DISCRIMINATION EVIDENCE (RELATIVE POSITION)
DISCRIMINATION RESULT
IM11
IM12a
PIMEA,PIME
IMEA,IME
IR
IM14a
UNKNOWN
IM11
IM12a
PIMEA,PIME
IMEA,IME
IR
PIMEB,PIME
IMEB,IME
IR
IM14a
UNKNOWN

METHOD, DEVICE, AND COMPUTER PROGRAM FOR GENERATING EVIDENCE IMAGE CORRESPONDING TO SIMILARITY DEGREES OF IMAGES

The present application is based on, and claims priority from JP Application Serial Number 2020-194805, filed Nov. 25, 2020, the disclosure of which is hereby incorporated by reference herein in its entirety.

BACKGROUND

1. Technical Field

The present disclosure relates to a technique using a machine learning model of a vector neural network type.

2. Related Art

About class discrimination of an image using a machine learning model, there has been known a technique for representing, as a color map, an image portion having a large gradient contributing to a loss function (Ramprasaath R. and six others, "Grad-CAM: Visual Explanations from Deep Networks via Gradient-based Localization" [online], Cornell University, [searched on Oct. 9, 2020], Internet <URL: https://arxiv.org/abs/1610.02391> (Non Patent Literature 1)).

The technique of the related art only shows a correlation between a result of the class discrimination and a portion in the image contributing to the result. For example, even if an algorithm model erroneously determines an input image of a "human" as a "gorilla", the technique of the related art only emphasizes a portion of the "human" in the input image. Because of such a background, if there is a technique for presenting, in a form interpretable by the human in a relation with the class discrimination, processing halfway leading to the class discrimination by the algorithm model, the technique is useful both technically and socially.

SUMMARY (1) According to a first aspect of the present disclosure, there is provided a method of causing one or more processors to execute a method in which a machine learning model of a vector neural network type is used. The machine learning model is learned to reproduce correspondence between a plurality of first images and a pre-label corresponding to each of the plurality of first images. The machine learning model includes one or more neuron layers, each of the one or more neuron layers includes one or more neuron groups, and each of the one or more neuron groups includes one or more neurons. First intermediate data output by the one or more neurons when the plurality of first images are input to the learned machine learning model, the first intermediate data being based on at least one of a first vector and a first activation, is stored in one or more memories in correlation with the neurons. The method includes: inputting a second image of an object to the machine learning model and, about each of the one or more neuron layers, acquiring second intermediate data based on at least one of a second vector and a second activation included in the one or more neurons; calculating a similarity degree between the first intermediate data and the second intermediate data in the one or more neuron layers; generating an evidence image corresponding to the similarity degree; and displaying the generated evidence image.

(2) According to a second aspect of the present disclosure, there is provided a device in which a machine learning model of a vector neural network type is used, the device including: one or more memories; and one or more processors. The one or more memories store (i) a machine learning model learned to reproduce correspondence between a plurality of first images and a pre-label corresponding to each of the plurality of first images, the machine learning model including one or more neuron layers, each of the one or more neuron layers including one or more neuron groups, each of the one or more neuron groups including one or more neurons, and (ii) first intermediate data output by the one or more neurons when the plurality of first images are input to the learned machine learning model, the first intermediate data being based on at least one of a first vector and a first activation, the first intermediate data being correlated with the neurons. The one or more processors are configured to execute: inputting a second image of an object to the machine learning model and, about each of the one or more neuron layers, acquiring second intermediate data based on at least one of a second vector and a second activation included in the one or more neurons; calculating a similarity degree between the first intermediate data and the second intermediate data in the one or more neuron layers; generating an evidence image corresponding to the similarity degree; and displaying the generated evidence image using a display.

(3) According to a third aspect of the present disclosure, there is provided a computer-readable non-transitory medium storing a program for causing one or more processors to execute a method in which a machine learning model of a vector neural network type is used. The machine learning model is learned to reproduce correspondence between a plurality of first images and a pre-label corresponding to each of the plurality of first images. The machine learning model includes one or more neuron layers, each of the one or more neuron layers includes one or more neuron groups, and each of the one or more neuron groups includes one or more neurons. One or more memories store, in correlation with the neurons, first intermediate data output by the one or more neurons when the plurality of first images are input to the learned machine learning model, the first intermediate data being based on at least one of a first vector and a first activation. The program causes the one or more processors to execute: inputting a second image of an object to the machine learning model and, about each of the one or more neuron layers, acquiring second intermediate data based on at least one of a second vector and a second activation included in the one or more neurons; calculating a similarity degree between the first intermediate data and the second intermediate data stored in the one or more memories in the one or more neuron layers; generating an evidence image corresponding to the similarity degree; and displaying the generated evidence image using a display.

BRIEF DESCRIPTION OF THE DRAWINGS

FIG. 1 is a diagram for explaining a discrimination system for a learning stage.

FIG. 5 is a diagram for explaining a setting method for a machine learning model.

FIG. 7 is a diagram for explaining a discrimination system for a discrimination stage.

FIG. 16 is a diagram for explaining second images.

DESCRIPTION OF EXEMPLARY EMBODIMENTS

A. First Embodiment

Figure 2:
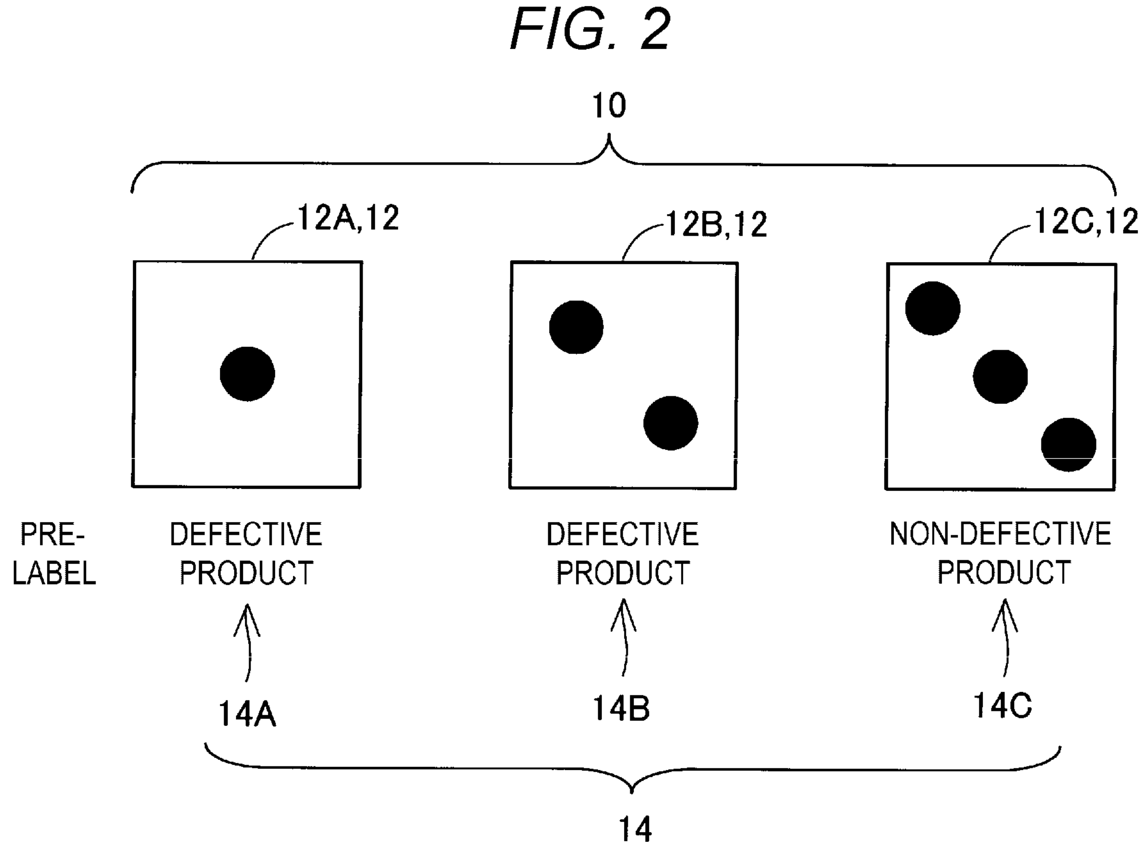
FIG. 2 is a diagram for explaining first images and pre-labels.

FIG. 1 is a diagram for explaining a discrimination system 100 for a learning stage. FIG. 2 is a diagram for explaining first images 12 and pre-labels 14. The discrimination system 100 shown in FIG. 1 shows a stage when learning of a machine learning model 30 of a vector neural network type is performed. The discrimination system 100 includes a data interface for exchanging data between a discrimination device 20 and an external device. The data interface is not limited but is suitably a USB adapter, a wired or wireless LAN adapter, or the like.

In this embodiment, the first images 12 are stored in a storage device of the discrimination device 20 from the external device via the data interface. The first images 12 are used for the learning of the machine learning model 30. A first input dataset 10 includes first data elements 12A, 12B, and 12C serving as first images of different imaged targets and pre-labels 14 corresponding to the first data elements 12A, 12B, and 12C. Among the pre-labels 14, a label corresponding to the first data element 12A is referred to as a pre-label 14A as well, a label corresponding to the first data element 12B is referred to as a pre-label 14B as well, and a label corresponding to the first data element 12C is referred to a pre-label 14C as well. The images 12 include a plurality of first data elements 12A, 12B, and 12C acquired by a sensor. The sensor is a sensor that acquires image data such as an RGB camera or an infrared camera.

As shown in FIG. 2, the first data elements 12A to 12C are dices serving as target objects of different types imaged by a camera. The first data element 12A is an image of a dice, all surfaces of which have one pip, imaged by the camera. The first data element 12B is an image of a dice, all surface of which have two pips, imaged by the camera. The first data element 12C is an image of a dice, all surface of which have three pips. 1000 each of the first data elements 12A to 12C are prepared. An image size of each of the first data elements 12A to 12C is 32×32 pixels. In 1000 each of the first data elements 12A to 12C, the position of a pip of the dice fluctuates by ±2 pixels at most and the size of the pip of the dice fluctuates by ±2 pixels at most. The first data elements 12A to 12C used for learning in the machine learning model 30 and second data elements serving as second images explained below subjected to label discrimination by the machine learning model 30 have a hierarchy in characteristics. "Have a hierarchy in characteristics" means that, when a data region of attention is increased in size stepwise from a very small region, different characteristics appear in each of the regions. For example, as the characteristics, a texture of the region, a shape appearing in the region, arrangement of elements appearing in the region, an overall configuration appearing in the region, and the like correspond to layers. The hierarchy of the characteristics is a characteristic structure generally seen in many data. The content of the present disclosure using the machine learning model 30 has high versatility.

The pre-labels 14 are stored in the first input dataset 10 to be respectively associated with the first data elements 12A to 12C and are input to a storage device 22. The pre-labels 14 include a non-defective product label serving as a first pre-label and a defective product label serving as a second pre-label. The pre-labels 14 are sometimes simply referred to as labels 14. The defective product label is associated with the first data element 12A as the pre-label 14. The defective product label is associated with the first data element 12B as the pre-label 14. The non-defective product label is associated with the first data element 12C as the pre-label 14. That is, the machine learning model 30 in this embodiment is used when a product obtained by printing or engraving three pips on surfaces of a cube is manufactured. The machine learning model 30 can distinguish a non-defective product and a defective product of the product.

The discrimination device 20 shown in FIG. 1 is a computer such as a personal computer. The discrimination device 20 includes the storage device 22, a processor 24, and a display 26. The storage device 22 includes a nonvolatile storage medium 23 functioning as a non-transitory storage medium such as a flash memory or an EEPROM and a DRAM functioning as a main memory. The machine learning model 30 and a collected data element 32 generated using the input first input dataset 10 are stored in the storage device 22. Various programs for controlling the operation of the discrimination device 20 are stored in the storage device 22.

The processor 24 executes the various programs stored in the storage device 22 to realize various functions. For example, the processor 24 functions as a learning section 240, an acquiring section 241, a similarity-degree calculating section 242, and an output-image generating section 244. In other embodiments, at least a part of the various functions may be realized by a hardware circuit. In the present disclosure, "processor" is a term including a CPU, a GPU, and a hardware circuit.

The learning section 240 executes learning of the machine learning model 30 using the first input dataset 10. The acquiring section 241 acquires first intermediate data and second intermediate data explained below and causes the storage device 22 to store the first intermediate data and the second intermediate data. The similarity-degree calculating section 242 calculates a similarity degree between the first intermediate data and the second intermediate data. The first intermediate data is data output by a neuron when the first images 12 included in the first input dataset 10 of the machine learning model 30 are input to the machine learning model 30. The second intermediate data is data generated by inputting, to the machine learning model 30, second images obtained by imaging a discrimination target object. Details of the first intermediate data and the second intermediate data are explained below.

The output-image generating section 244 generates an output image IMO including an evidence image IME corresponding to the similarity degree calculated by the similarity-degree calculating section 242. The evidence image IME is an image indicating evidence discriminated by the machine learning model 30 about the second images. The output image IMO is an image for explaining the discrimination evidence to a user. Details of the output image IMO including the evidence image IME are explained below. The output image IMO generated by the output-image generating section 244 is displayed by the display 26. The display 26 is provided in the discrimination device 20 but may be a display of another device, for example, a terminal device such as a smartphone.

The display 26 is used to display various kinds of information. The display 26 is, for example, a liquid crystal monitor. The display 26 displays, as the various kinds of information, for example, a discrimination result of data elements discriminated using the learned machine learning model 30 and the output image IMO.

The machine learning model 30 is an algorism model of a vector neural network type and is a hierarchy type including a plurality of layers. The machine learning model 30 is a network that makes it possible to omit dynamic routing executed in a capsule network. The machine learning model 30 in this embodiment uses an algorithm of a vector neural network type that does not require iterative processing that is necessary in the dynamic routing. This algorithm is called an algorism of a vector neural network type in a narrow sense. The capsule network and the vector neural network in a narrow sense are machine learning models in which a vector neuron, an input and an output to and from which are vectors, is a neuron of a network. Accordingly, the capsule network and the vector neural network in a narrow sense are algorithms included in the vector neural network. The neuron is called "node" as well. A difference between the algorism of the capsule network and the algorithm of the vector neural network in a narrow sense is explained below.

An overview of an algorism of the dynamic routing of the capsule network is represented by the following Expressions (1) to (5).

[Math. 1]

$$V_{ij} = W_{ij} X_i \tag{1}$$

[Math. 2]

$$u_j = \frac{1}{Z} \sum_i R_{ij} V_{ij} \tag{2}$$

[Math. 3]

$$a_j = F(a_i, R_{ij}, V_{ij}) \tag{3}$$

[Math. 4]

$$R_{ij} = G(a_j, u_j V_{ij}) \tag{4}$$

[Math. 5]

$$X_j = u_j \tag{5}$$

In the above Expressions (1) to (5), $X_i$ is an output of a capsule in a layer L and $X_j$ is an output of a capsule in the next layer L+1. $W_{ij}$ is a transformation matrix for calculating a prediction value of $X_j$ from $X_i$ and is optimized in a learning process of the capsule network and $a_i$ is an activation value of the capsule in the layer L. $R_{ij}$ is called routing factor and is initialized by a constant at an algorithm start time. $R_{ij}$ is an element for determining to which capsule of the next layer an output is performed from which capsule of the preceding layer. The dynamic routing means dynamically changing $R_{ij}$ for each data element and determines an optimum value using a method of probabilistic statistics. "F" and "G" described in Expressions (3) and (4) are expressions abstracting and representing probabilistic statistic processing. When Expressions (3) and (4) are considered in, for example, an EM algorithm (Expectation-Maximization algorithm), "F" can be associated as representing an M step and "G" can be associated as representing an E step. Calculation is repeatedly executed from Expression (4) to Expression (2) until $R_{ij}$ converges. In the capsule network, repeated calculation of approximately twice to third times is recommended.

On the other hand, an output determination algorithm of the vector neural network in a narrow sense used in the machine learning model 30 in this embodiment is explained below.

[Math. 6]

$$v_{ij} = W_{ij}^{L} M_i^{L} \tag{6}$$

[Math. 7]

$$\mu_j = \sum_i v_{ij} \tag{7}$$

[Math. 8]

$$a_j = \mathrm{softmax}(\|\mu_j\|) = \frac{\exp(\beta\|\mu_j\|)}{\Sigma_k \exp(\beta\|\mu_k\|)} \tag{8}$$

[Math. 9]

$$M_j^{L+1} = a_j \times \frac{1}{\|\mu_j\|} \mu_j \tag{9}$$

An element Ema with "i" and "L" added to "M" in the above Expression (6) represents an output of an i-th vector neuron in the layer L. An element Emb with "ij" and "L" added to "W" in Expression (6) is a transformation matrix for calculating a prediction value $v_{ij}$ concerning a direction of an element of the left side of the above Expression (9), which is an output of a j-th vector neuron of the layer L+1 and is a learning target by a stochastic gradient descent method. In Expression (7), $\mu_j$ is a sum of the prediction values $v_{ij}$ of the elements Ema from all vector neurons present in the layer L and i takes 1 to N: N is an integer. A norm of $\mu_j$ is larger as a prediction value is larger and more coherent. A norm of $\mu_j$ about all vector neurons of the layer L+1 is converted into likelihood $a_j$, which is a standardized value, by a Softmax function of Expression (8). β is a parameter for adjusting influence of the magnitude of the norm on the likelihood as described in the above Expression (8). The conversion is executed with β=1 this time. In Expression (8), "k" takes 1 to N. The likelihood $a_j$ is an element equivalent to an activation in the capsule network. Accordingly, the likelihood $a_j$ is referred to as activation $a_j$ as well and j takes a value of 1 to M. "M" is an integer. Since information concerning the likelihood $a_j$ is integrated with the element Emb according to Expression (9), the information is not explicitly output from a vector neuron to the next vector neuron. According to Expression (9), only information concerning a direction of $\mu_j$ is extracted and weighted with relative likelihood "a" in the layer L+1 and the element Ema is determined. The likelihood $a_j$ is referred to as likelihood "a" as well when being collectively referred to.

Two norms of the element Emb are incorporated in a loss function such that the element Emb does not take an excessively large value in a process of learning. A norm of the element Emb is defined using a product with an appropriate vector. When the element Ema is used as a vector, the element Ema is represented by the following Expression (10).

[Math. 10]

$$\|W_{ij}^L\| = \max_{M_i^L \neq 0} \frac{\|W_{ij}^L M_i^L\|_2}{\|M_i^L\|_2} \rightarrow \|W_{ij}^L\|_2 \|M_i^L\|_2 \geq \|W_{ij}^L M_i^L\|_2 = \|v_{ij}\|_2. \tag{10}$$

The magnitude of an output M, which is a vector of the vector neuron, is weighted by the relative likelihood "a" of layers. Therefore, a vote from information having high likelihood "a" has large influence. An activation "a" is a normalization coefficient obtained by normalizing a norm $|\mu_j|$ concerning all nodes of the higher order layer L+1. Therefore, an activation value $a_j$ can be considered an indicator indicating relative output intensity of the nodes in all the nodes in the higher order layer L+1.

Figure 3:
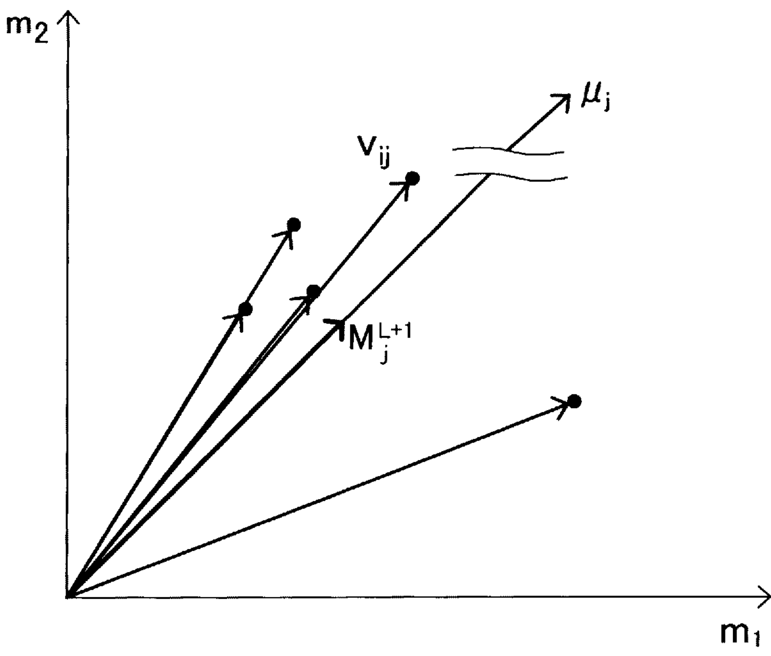
FIG. 3 is a first diagram conceptually showing determination of vector neurons by prediction votes.
Figure 4:
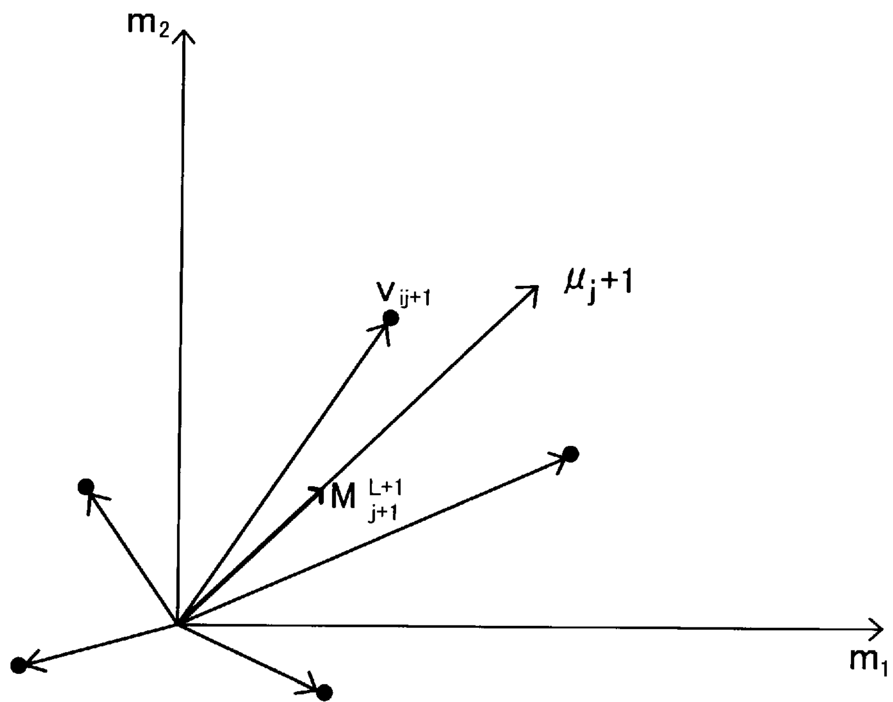
FIG. 4 is a second diagram conceptually showing determination of vector neurons by the prediction votes.

FIG. 3 is a first diagram conceptually showing determination of vector neurons by prediction votes. FIG. 4 is a second diagram conceptually showing determination of vector neurons by the prediction votes. In FIGS. 3 and 4, for ease of understanding, the number of dimensions of the vector neuron is set to "2" of a dimension m1 and a dimension m2. As shown in FIG. 3, prediction votes in the same direction lead to the output M with high likelihood "a". On the other hand, as shown in FIG. 4, prediction votes in different directions lead to the output M with low likelihood "a".

FIG. 5 is a diagram for explaining a setting method for the machine learning model 30 of the vector neural network type. The machine learning model 30 includes, in order from the input first image 12 side, a convolutional layer 33, a primary neuron layer 35, a first neuron layer 37, a second neuron layer 38, and a classification neuron layer 39, which is the final layer. Among these five layers 33 to 39, the convolutional layer 33 is the highest order layer. The number of layers of the machine learning model 30 is changed as appropriate according to a type of an input data element. In this embodiment, a neuron layer is a hierarchical structure formed by four layers 35, 37, 38, and 39. The primary neuron layer 35, the first neuron layer 37, the second neuron layer 38, and the classification neuron layer 39 are arrayed in order from a high order side. Vectors M and activations "a" of neurons in a neuron layer on a low order side are determined using a neuron group of the preceding layer, which is a layer on the high order side formed by one or more neurons set by kernels and strides. The vectors M of the neurons are sixteen dimensions in this embodiment.

By applying 5×5 kernels to data elements 12A to 12C of the first images 12 with a stride "2", a partial range for giving an output to one node of the convolutional layer 33 in among ranges of the data elements 12A to 12C is determined. The number of kernels applied to the data elements 12A to 12C is thirty-two. Consequently, the convolutional layer 33 is formed to include a partial region Rx in which a vertical axis, which is a first axis x, and a second axis y, which is a horizontal axis orthogonal to the first axis x, are respectively divided into fourteen. The first axis x and the second axis y define a plane position coordinate of a node array. A size in an x direction along the first axis x and a size in a y direction along the second axis y are referred to as "resolution" as well. The number of channels indicating the number of third axis z direction, which are depth directions of the convolutional layer 33, is thirty-two as many as the number of kernels. In FIG. 5, the sizes in the x, y, and z directions are shown as 14, 14, and 32 in the convolutional layer 33. In FIG. 5, illustration of the x axis, the y axis, and the z axis is omitted in the layers other than the convolutional layer 33.

The "partial range" explained above is a region on an input image of the first image 12, which is a data element, and is one region specified by a position on the first axis x and a position on the second axis y. As it is evident from the following explanation, the size of the "partial range" on the data element is different depending on to which of the neuron layers 35, 37, 38, and 39 a neuron corresponding to the "partial range" or the partial region Rx belongs. On the other hand, the "partial region Rx" is a region specified by a position on the vertical axis and a position on the horizontal axis in the neuron layer. Specifically, each "partial region Rx" in the neuron layer is a region specified by a position on the first axis x, a position on the second axis y, and a position on a third axis z corresponding to a channel. Each "partial region Rx" in the neuron layer has dimensions of "Height"×"Width"×"Depth" corresponding to the first axis x, the second axis y, and the third axis z. In this embodiment, the number of neurons included in one "partial region Rx" is "1×1×the number of depths". In the present disclosure, numerical values "35", "37", "38", and "39" are substituted in "x" of the partial region Rx according to the neuron layers 35, 37, 38, and 39. For example, a partial region R35 indicates a region in the primary neuron layer 35.

By applying 1×1×32 kernel to the convolutional layer 33 with a stride "1", a partial region R33 output to one neuron of the primary neuron layer 35 is determined out of partial regions R33 of the convolutional layer 33. Since sixteen types of kernels are used in the same size and the same stride, the number of neurons corresponding to one partial region R33 of the convolutional layer 33 is sixteen in the primary neuron layer 35. A transformation matrix is used for generation of an output from a node of the convolutional layer 33 to a neuron of the primary neuron layer 35. The output determination algorithm indicated by the above Expressions (6) to (10) is not used. A dimension of a kernel for convolution into a neuron layer is sometimes represented as "Height"×"Width"×"Depth"×"the number of elements of a vector M" when the number of channels and the number of elements of a neuron are also considered. According to the representation, a dimension of a kernel used for convolution from the convolutional layer 33 into the primary neuron layer 35 is 1×1×32×16.

By applying 3×3×16 kernel to the primary neuron layer 35 with a stride "1", the partial region R35 for giving an output to a neuron included in one partial region R37 of the first neuron layer 37 is determined out of partial regions R35 of the primary neuron layer 35. Since twelve types of kernels are used in the same size, the same dimension, and the same stride, the number of neurons included in the partial region R37 of the first neuron layer 37 is twelve. The output determination algorithm indicated by the above Expressions (6) to (10) is used for generation of an output from a neuron of the primary neuron layer 35 to a neuron of the first neuron layer 37. The kernels applied to the primary neuron layer 35 are also represented as designating 3×3×16 neurons of the primary neuron layer 35 used to determine one neuron of the first neuron layer 37 according to dynamic routing by agreement. This applies to the following explanations as well. About one partial region Rx, a set formed by one or more, in this embodiment, a plurality of neurons is referred to as neuron group as well. That is, the neuron group includes one or more neurons arranged side by side in the depth direction.

By applying 7×7×12 kernel to the first neuron layer 37 with a stride "2", the partial region R37 for giving an output to one partial region R38 of the second neuron layer 38 is determined out of partial regions R37 of the first neuron layer 37. Since six types of kernels are used in the same size, the same dimension, and the same stride, the number of neurons included in the partial region R38 of the second neuron layer 38 is six. When a neuron of the second neuron layer 38 is generated from a neuron of the first neuron layer 37, the output determination algorithm indicated by the above Expressions (6) to (10) is used.

By applying 3×3×6 kernel to the second neuron layer 38 with a stride "1", the partial region R38 for giving an output to one partial region R39 of the classification neuron layer 39 is determined out of partial regions R38 of the second neuron layer 38. Since two types of kernels are used in the same size, the same dimension, and the same stride, the number of neurons included in the partial region R39 of the classification neuron layer 39 is two. When a neuron of the classification neuron layer 39 is generated from a neuron of the second neuron layer 38, the output determination algorithm indicated by the above Expressions (6) to (10) is used.

The classification neuron layer 39, which is the final layer, is formed by one partial region R39. The classification neuron layer 39 classifies a data element input to the machine learning model 30 into a predetermined label. In this embodiment, the predetermined label is a label represented by a combination of a label "0" indicating a non-defective product label and a label "1" indicating a defective product label. In the other embodiments, the predetermined label may be a label represented by a combination of a label "0" indicating a known label and a label "1" indicating an unknown label.

The classification neuron layer 39 is formed by one partial region R39. In the classification neuron layer 39, a label corresponding to, of two neurons, a neuron having the largest activation "a" is an output. The label output from the classification neuron layer 39 is controlled by the processor 24 to be output by the display 26. Specifically, the output of the classification neuron layer 39 is converted into a plurality of determination values for classes as many as the number of labels. In this embodiment, outputs of two neurons of the classification neuron layer 39 are converted into two determination values corresponding to two labels "0" and "1". The determination values are usually values normalized by a Softmax function. Specifically, determination values for two classes can be obtained by executing, for example, an arithmetic operation for calculating, from output vectors of neurons of the classification neuron layer 39, vector lengths of the output vectors and vector lengths of two nodes are normalized by the Softmax function. The activation value "a" is a value equivalent to a vector length of the output vector M and is normalized. Therefore, the activation value "a" in each of the two neurons of the classification neuron layer 39 may be output and directly used as the determination values for the two classes.

In FIG. 5, one partial region R35 of the primary neuron layer 35 corresponds to a partial range of 5×5 pixels of the data elements 12A to 12C. One partial region R37 of the first neuron layer 37 corresponds to a partial range of 9×9 pixels of the data elements 12A to 12C. The partial region R38 of the second neuron layer 38 corresponds to a partial range of 21×21 pixels of the data elements 12A to 12C. The partial region R39 of the classification neuron layer 39 corresponds to a partial range of 29×29 pixels of the data elements 12A to 12C.

Figure 6:
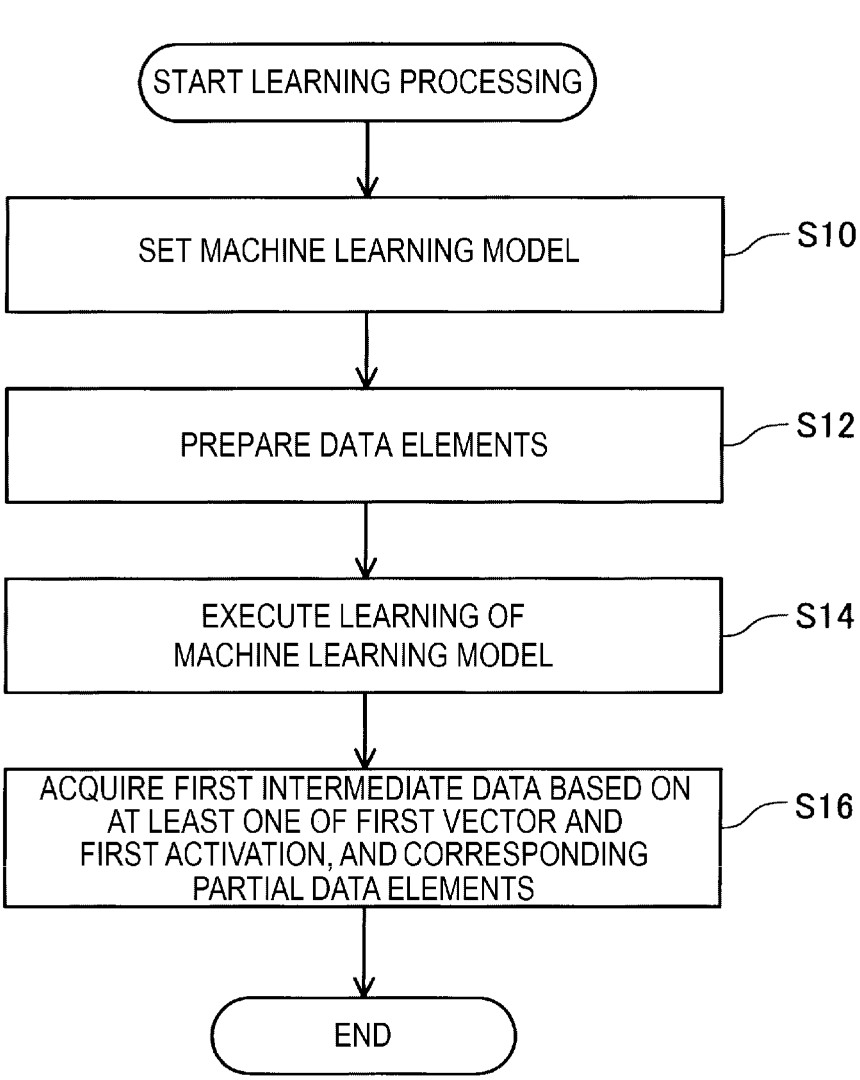
FIG. 6 is a flowchart showing learning processing executed in a learning stage of the machine learning model.

FIG. 6 is a flowchart showing learning processing executed in a learning stage of the machine learning model 30. First, in step S10, setting of parameters of the machine learning model 30 is performed. In step S10, as explained with reference to FIG. 5, the number of layers and the sizes of the kernels and the strides applied among the layers are set.

Subsequently, in step S12, the first data elements 12A, 12B, and 12C are prepared as the first images 12 to be learned by the machine learning model 30. The order of step S10 and step S12 is not limited to the above. Step S12 may be executed earlier than step S10.

Subsequently, in step S14, the first data elements 12A to 12C serving as the first images 12 are sequentially input to the machine learning model 30. The machine learning model is learned by the learning section 240 to reproduce correspondence between the data elements 12A to 12C serving as the first images 12 and pre-labels corresponding to the data elements 12A to 12C. The learning section 240 of the processor 24 learns the machine learning model 30 using, for example, an algorithm of a minibatch gradient descent method. In this embodiment, the learning section 240 of the processor 24 learns the machine learning model 30 using the algorithm of the minibatch gradient descent method in which a size of a minibatch, which is a subset of data elements, is set to "32" and an epoch is set to "20000". As a result of the learning, a correct answer ratio of the machine learning model 30 is 100%.

In step S16, the processor 24 inputs, again, the plurality of first data elements 12A, 12B, and 12C used for the learning to the machine learning model 30 learned in step S14 and executes the following about each of the first neuron layer 37, the second neuron layer 38, and the classification neuron layer 39, which are neuron layers. That is, the acquiring section 241 of the processor 24 acquires first intermediate data based on at least one of a first activation a1 and a first vector M1 included in the neurons of the layers 37, 38, and 39 in correlation with partial ranges on the first data elements 12A to 12C, the neurons corresponding to the partial ranges. The acquiring section 241 of the processor 24 stores, in the storage device 22, the first intermediate data and relative positions of the partial ranges correlated with each other. The acquiring section 241 may store images of the correlated partial ranges in the storage device 22. The partial ranges on the first data elements 12A to 12C, the neuron corresponding to the partial ranges, are referred to as first partial data elements as well. In the following explanation, the stored first intermediate data and first partial data elements are described as collected data elements 32 as well. In the other embodiments, in the primary neuron layer 35, as in the layers 37, 38, and 39, the first intermediate data may be acquired in correlation with the first partial data elements. The first intermediate data does not always need to be acquired from all of the neuron layers. For example, the first intermediate data may be acquired from only the second neuron layer 38 or may be acquired from a combination of several layers. This applies to second intermediate data explained below as well. Further, in the other embodiments, the plurality of first data elements 12A, 12B, and 12C used for the learning of the machine learning model 30 in step S14 may be divided into two groups. In this case, the first data elements 12A, 12B, and 12C may be divided into a group of the first data elements 12A, 12B, and 12C used for the learning of the machine learning model 30 in step S14 and a group of the first data elements 12A, 12B, and 12C not used for the learning. In step S14, the machine learning model 30 may be learned with only one group. In step S16, the first intermediate data may be generated using the two groups. In short, as long as the same pre-labels 14A, 14B, and 14C as the pre-labels 14A, 14B, and 14C of the first data elements 12A, 12B, and 12C used for the learning of the machine learning model 30 are given, data for generating intermediate data in step S16 is not limited to only the first data elements 12A, 12B, and 12C used for the learning of the machine learning model 30.

As explained above, with the method executed by the processor 24, according to step S16, it is possible to acquire the first intermediate data based on at least one of the first activation a1 and the first vector M1 included in the neurons. Consequently, when second images, which are discrimination target data elements, are input to the machine learning model 30, by acquiring second intermediate data based on at least one of a second activation a2 and a second vector M2 included in the neurons, the processor 24 can calculate a similarity degree between characteristic spectra generated from the first intermediate data and characteristic spectra generated from the second intermediate data. The second intermediate data may be the second vector M2 itself or the second activation a2 itself or may be data obtained by performing data processing such as weighting on the second vector M2 or the second activation a2. In this embodiment, the second intermediate data is configured by the second vector M2 and the second activation a2. In the other embodiments, the first intermediate data and the second intermediate data each may be characteristic spectra. Details of the characteristic spectra are explained below. The similarity-degree calculating section 242 calculates a similarity degree, whereby the output-image generating section 244 can generate an output image including an evidence image corresponding to the similarity degree. Accordingly, the processor 24 is capable of outputting evidence of discrimination of the input second images performed using the machine learning model 30.

Figure 8:
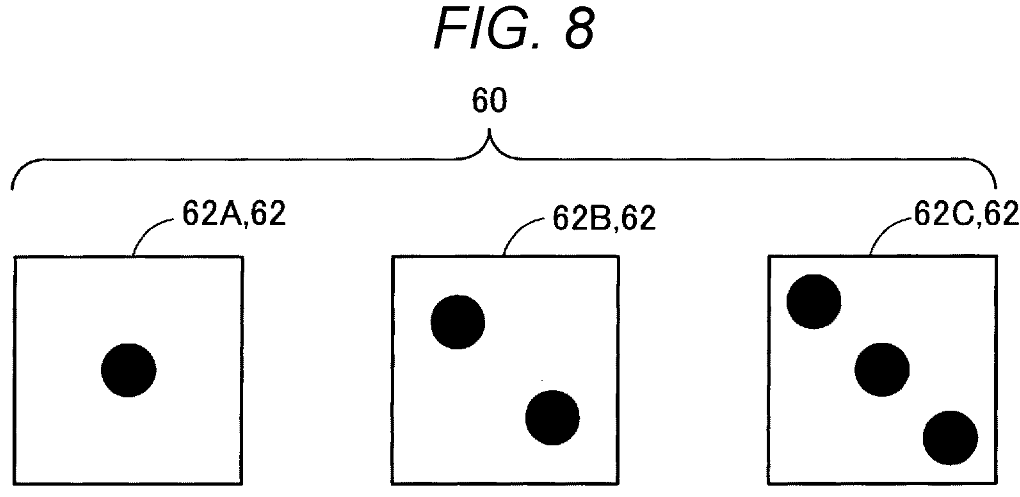
FIG. 8 is a diagram for explaining second images.

FIG. 7 is a diagram for explaining the discrimination system 100 for a discrimination stage. FIG. 8 is a diagram for explaining second images 62. The discrimination system 100 shown in FIG. 7 is different from the discrimination system 100 shown in FIG. 1 in that a second input dataset 60 is used as a data element input to the machine learning model 30.

As shown in FIG. 7, the second input dataset 60 includes a plurality of second images 62. As shown in FIG. 8, the plurality of second images 62 are second data elements 62A to 62C representing images acquired by imaging one surface with a camera in each of a manufactured plurality of dices. The size of the second data elements 62A to 62C serving as second images is, for example, 32×32 pixels same as the size at the learning time of the machine learning model 30. 1100 each of the second data elements 62A to 62C are prepared. The position of a pip of the dice fluctuates by ±2 pixels at most and the size of the pip of the dice fluctuates by ±2 pixels at most.

The second data elements 62A to 62C are input to the learned machine learning model 30 one by one, whereby class discrimination is performed, that is, a label is discriminated. For example, when the second data element 62A representing one pip or the second data element 62B representing two pips is input to the machine learning model 30, it is discriminated that the product is a defective product and, when the second data element 62C representing three pips is input, it is discriminated that the produce is a non-defective product. In this embodiment, the processor 24 generates discrimination evidence obtained by discriminating a label and causes the display 26 to display the discrimination evidence together with the discriminated label. A generation method for the discrimination evidence is explained below.

Figure 9:
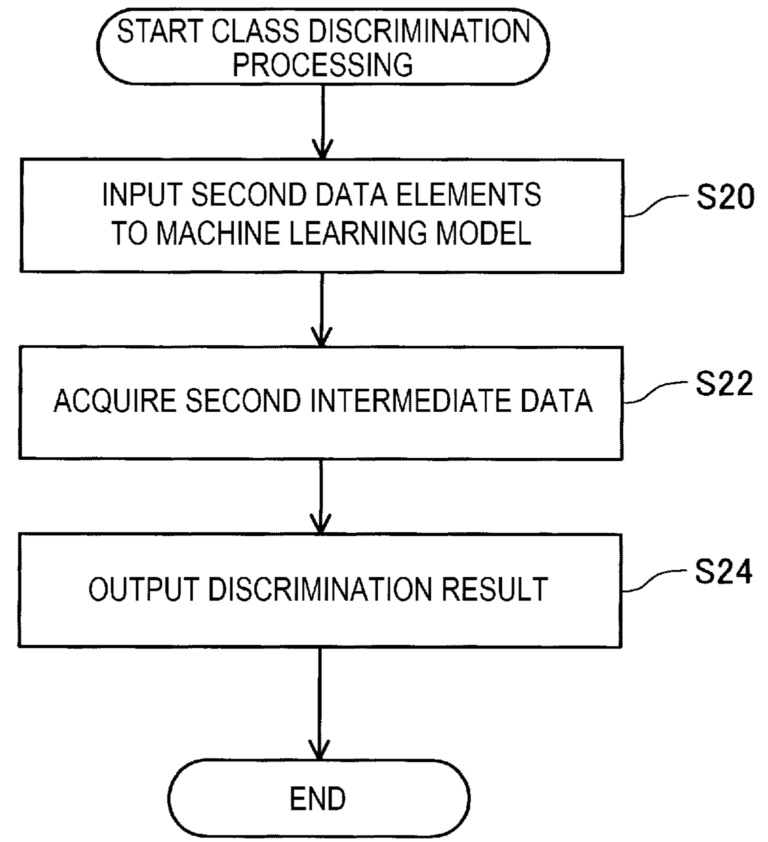
FIG. 9 is a flowchart of class discrimination processing for the second images.

FIG. 9 is a flowchart of class discrimination processing for the second images 62. First, in step S20, the processor 24 inputs the second data elements 62A to 62C one by one to the machine learning model 30 learned using the first images 12 and executes class discrimination. Subsequently, in step S22, the acquiring section 241 of the processor 24 calculates, that is, derives, for each one of the input second data elements 62A to 62C, a state of the machine learning model 30, that is, a second activation a2 serving as the activation “a” of two neurons of the classification neuron layer 39. In step S22, the processor 24 acquires, about each of the second data elements 62A to 62C input to the machine learning model 30, second intermediate data from the machine learning model 30. Details of the acquisition of the second intermediate data are explained below with reference to step S30 in FIG. 10.

Subsequently, in step S24, the processor 24 generates, based on a calculation result of step S22, as a discrimination result, a label corresponding to a neuron in which the second activation a2 is the maximum in the classification neuron layer 39 and outputs the label to the display 26. The discrimination result of the label is not limited to image information and only has to be information that can be notified to the user. For example, the discrimination result of the label may be output as voice information. In this case, the display 26 includes a speaker. In the following explanation, the discrimination result of the label is stored in the storage device 22 as a part of the collected data element 32.

Figure 10:
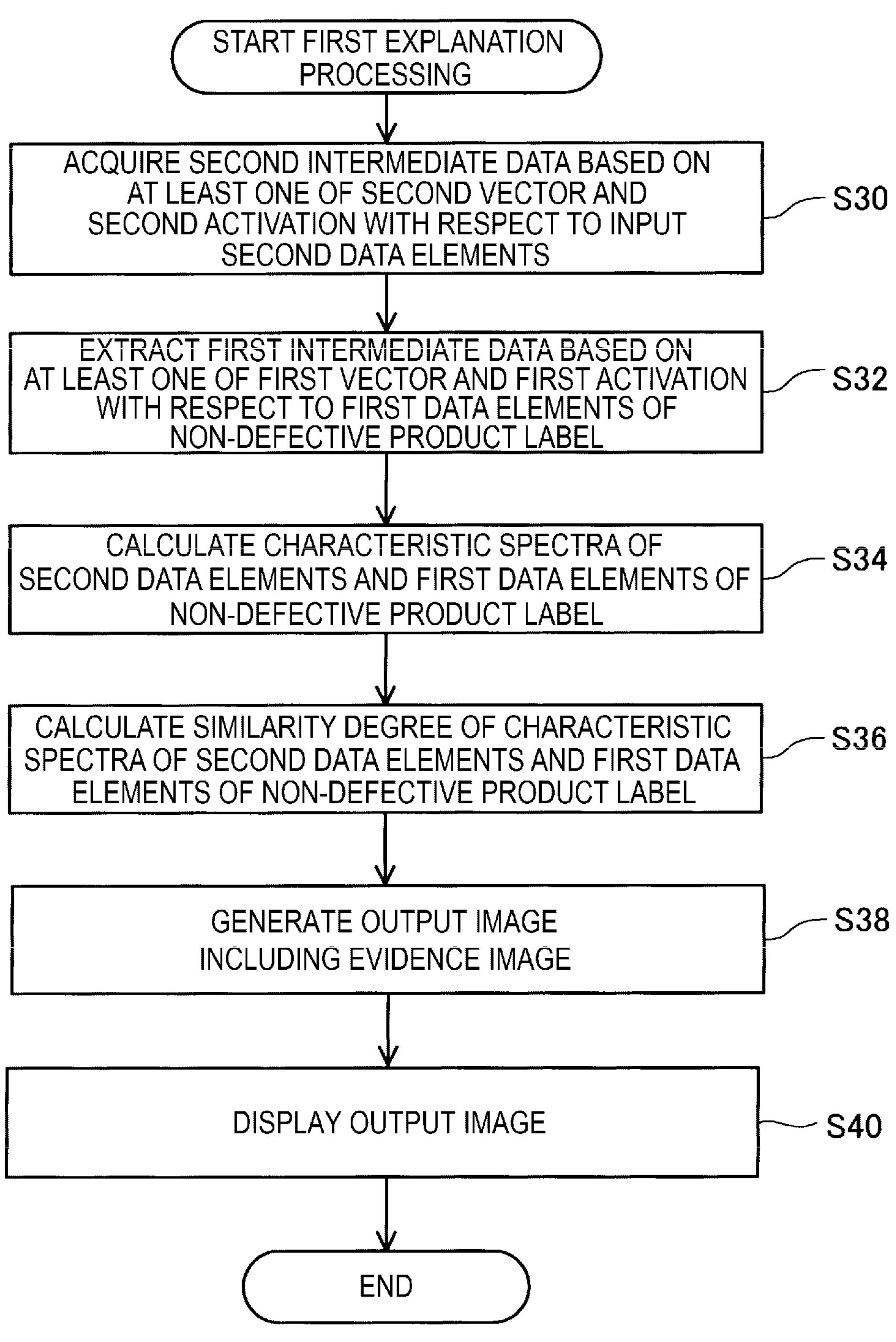
FIG. 10 is a flowchart of first explanation processing.
Figure 11:
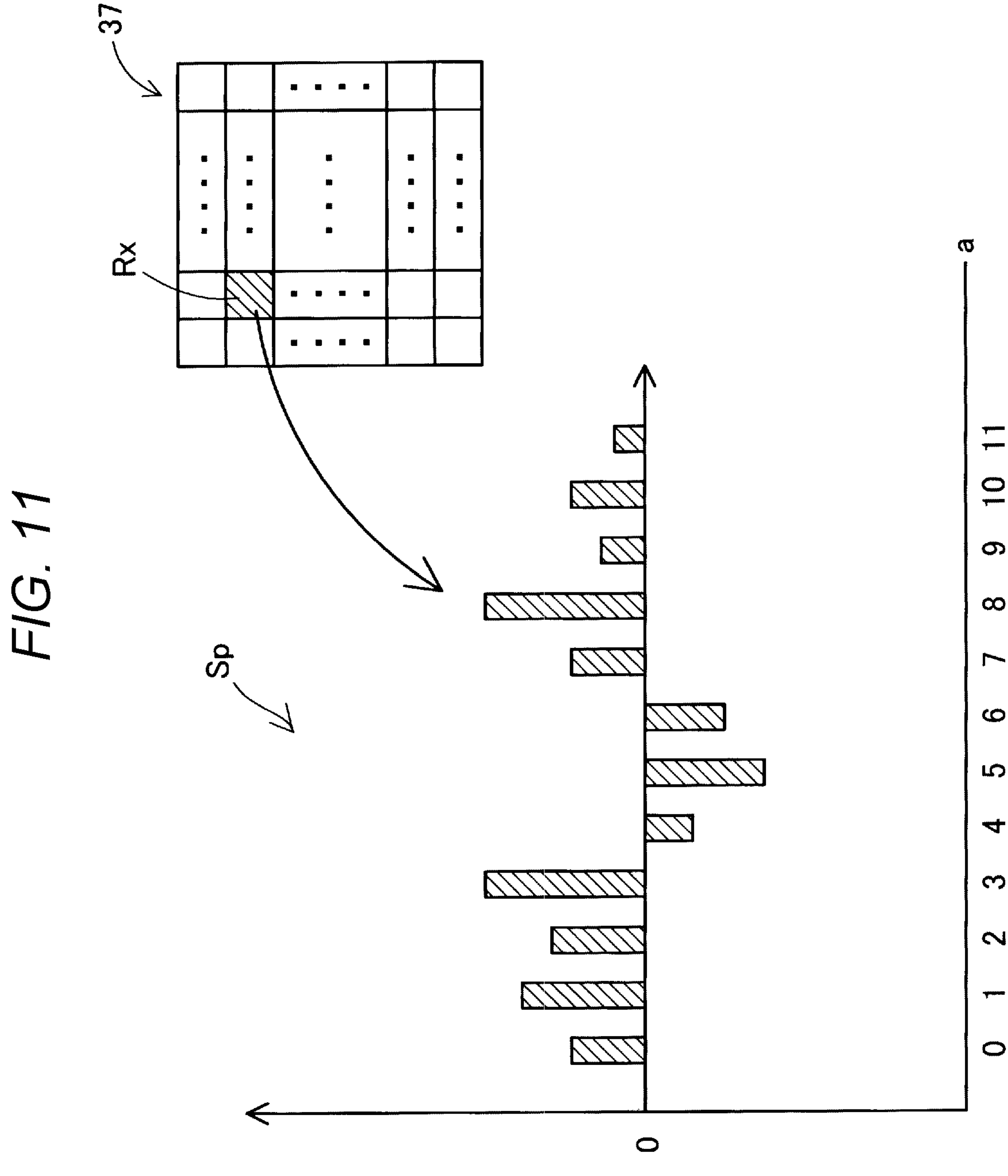
FIG. 11 is a diagram for explaining characteristic spectra.

FIG. 10 is a flowchart of first explanation processing. The first explanation processing may be performed after the class discrimination processing shown in FIG. 9 or may be performed in parallel to the class discrimination processing shown in FIG. 9. The first explanation processing is executed by the processor 24. The first explanation processing is processing for comparing the first data element 12C associated with a non-defective product label stored in the collected data element 32 and the input second data elements 62A to 62C and explaining a discrimination evidence about why the product is discriminated as a non-defective product or why the product is not discriminated as a non-defective product. Information generated by the first explanation processing may be output together with the discrimination result in step S24 in FIG. 9. FIG. 11 is a diagram for explaining characteristic spectra.

As shown in FIG. 10, first, in step S30, the processor 24 inputs the second data elements 62A to 62C to the learned machine learning model 30 one by one and causes the machine learning model 30 to execute class discrimination. The acquiring section 241 of the processor 24 acquires second intermediate data respectively output by a plurality of neurons when the class discrimination ends and stores the second intermediate data in the storage device 22. In this embodiment, the second intermediate data includes the second vector M2 and the second activation a2. Step S30 is executed about at least each of the first neuron layer 37, the second neuron layer 38, and the classification neuron layer 39. In step S30, the processor 24 stores a partial range on the second data elements 62A to 62C, which are second images, the partial range corresponding to the second intermediate data, in the storage device 22 in correlation with the second intermediate data. In this embodiment, step S30 is executed in step S22 of the class discrimination process shown in FIG. 9. Subsequently, in step S32, the processor 24 reads out, from the storage device 22, the first intermediate data obtained when the class discrimination is carried out on all of the first data elements 12C to which a non-defective label is attached as a pre-label. In this embodiment, the first intermediate data is based on the first vector M1 and the first activation a1.

Subsequently, in step S34, the similarity-degree calculating section 242 of the processor 24 calculates characteristic spectra Sp in the second intermediate data of the second data elements 62A to 62C and characteristic spectra Sp in the first intermediate data of the first data element 12C of the non-defective product label. Specifically, the similarity-degree calculating section 242 of the processor 24 calculates the respective characteristic spectra Sp from the first intermediate data and the second intermediate data for each of the partial regions R37, R38, and R39 of each of the first neuron layer 37, the second neuron layer 38, and the classification neuron layer 39. In this embodiment, the characteristic spectra Sp may be represented by, for each of partial regions Rx in the neuron layer, normalizing one or more vectors M with an average 0 and a dispersion 1 or standardizing the vectors M1 using the Softmax function and arraying the vectors M. The characteristic spectra Sp may be represented by, for each of the partial regions Rx, weighting dimensions or elements of the vector M with the activations "a" corresponding thereto and arraying the dimensions or the elements. The weighting can be realized by, for example, calculating a product of values of the vector M and the activation "a" corresponding to the vector M. The characteristic spectra Sp may be represented by arraying values of the activation "a" for each of the partial regions R37, R38, and R39 of the neuron layers 37, 38, and 39. The arrayed activations "a" may be normalized to be an average 0 and a dispersion 1. The characteristic spectra Sp may be represented by arraying the vectors M and/or the activations "a" for each of the partial regions R37, R38, and R39 of the neuron layers 37, 38, and 39. The characteristic spectra Sp may not be normalized and the vectors M of a plurality of dimensions, in this embodiment, sixteen dimensions may be converted into one dimension and arrayed. The partial regions Rx are associated with the partial ranges of the second data elements 62A to 62C in advance.

A graph shown in FIG. 11 corresponds to the first neuron layer 37. In the first neuron layer 37, one partial region R37 includes twelve neurons arranged side by side in the depth direction. In FIG. 11, as an example, the respective activations "a" output by twelve neurons belonging to certain one partial region R37 are normalized to an average 0 and a dispersion 1 and arranged side by side. The characteristic spectra Sp shown in FIG. 11 include, as elements, these normalized plurality of activations "a". In the example of the characteristic spectra Sp shown in FIG. 11, the horizontal axis indicates element numbers "0" to "11" for identifying the activations "a" corresponding to the neurons and the vertical axis indicates values of the activations "a".

As shown in FIG. 10, subsequently, in step S36, the similarity-degree calculating section 242 of the processor 24 calculates a similarity degree based on the first intermediate data and the second intermediate data. Specifically, the similarity-degree calculating section 242 of the processor 24 calculates, in each layer of the first neuron layer 37, the second neuron layer 38, and the classification neuron layer 39, a similarity degree between the characteristic spectra Sp generated from the second intermediate data of the second data elements 62A to 62C and the characteristic spectra Sp generated from the first intermediate data of the first data element 12C of the non-defective product label. That is, the similarity degree calculated in step S36 represents a degree of similarity of the discrimination target second images 62 to characteristics of a class to which the first images 12, which are comparison sources, belong. Accordingly, the similarity degree calculated in step S36 is referred to as similarity degree by class as well.

In this embodiment, the similarity-degree calculating section 242 calculates a similarity degree of the partial regions Rx belonging to the same layer. Specifically, for each of the neuron layers 37, 38, and 39, similarity degrees of all the partial regions Rx at the time when the first data elements 12A to 12C are given are calculated with respect to one partial region Rx at the time when the second data elements 62A to 62C are given. That is, the similarity-degree calculating section 242 calculates a similarity degree between the first intermediate data and the second intermediate data about each of a plurality of neuron groups corresponding to a plurality of partial regions Rx. Certain one partial region Rx in the neuron layers 37, 38, and 39 at the time when the first data elements 12A to 12C are given and the partial region Rx in the neuron layers 37, 38, and 38 at the time when the second data elements 62A, 62B, and 62C are given respectively correspond to a partial range on the first images 12, which are the first data elements 12A to 12C, and a partial range on the second images 62, which are the second data elements 62A to 62C. Accordingly, the similarity degree can also be interpreted as a similarity degree between the partial range of the first images 12 and the partial range of the second images 62. In other words, in this embodiment, the intermediate data are compared in a form of a similarity degree between the first data elements 12A to 12C and the second data elements 62A to 62C in all the partial ranges belonging to the same layer on the first data elements 12A to 12C with respect to the partial ranges belonging to a certain layer on the second data elements 62A to 62C. However, as explained below, a similarity degree may be calculated between the same partial ranges of the same layer. The layer is correlated with the size of the partial ranges. As explained above, when the neuron layers 37, 38, and 39 are different, the size of the partial range defined on the first data elements 12A to 12C, that is, the first images 12 and the size of the partial range defined on the second data elements 62A to 62C, that is, the second images 62 is also different. As the similarity degree, any indicator for comparing two vectors can be used. For example, a cosine similarity degree, a mean square error (MSE), or a peak S/N ratio (PSNR) is used.

In step S36, for each of the partial regions Rx of each of the first neuron layer 37, the second neuron layer 38, and the classification neuron layer 39, a value of the highest similarity degree among similarity degrees of the characteristic spectra Sp of the first intermediate data corresponding to all the first data elements 12C is set as a similarity degree of the partial region Rx of the second data element 62. The similarity degree of the partial region Rx of the second data element 62 is stored in the storage device 22 in association with a partial image of a partial range corresponding to the partial region Rx in the second images 62 and the activation "a" of the partial region Rx. In the other embodiments, calculation targets of the similarity degree in step S36 may be each partial regions Rx present in the same relative positions in the same layer. When similarity degrees are calculated in order from the first neuron layer 37 on the high order layer side, the similarity degree is lower than a predetermined threshold in the high order layer, and evidence of the class discrimination can be shown in the high order layer, similarity degrees in the second neuron layer 38 and the classification neuron layer 39, which are low order layers, may not be calculated.

Subsequently, in step S38, the output-image generating section 244 of the processor 24 generates the output image IMO including the evidence image IME corresponding to the calculated, that is, derived similarity degree by class. In step S38, the output-image generating section 244 gives a gradation value corresponding to the similarity degree by class to pixels of the evidence image IME to generate the evidence image IME. In this embodiment, the output-image generating section 244 generates partial evidence images PIME corresponding to a plurality of similarity degrees by class calculated in step S36 and two-dimensionally arrays the partial evidence images PIME to generate the evidence image IME. Subsequently, in step S40, the display 26 displays the generated output image IMO according to a command from the processor 24 to output the output image IMO.

Figure 12:
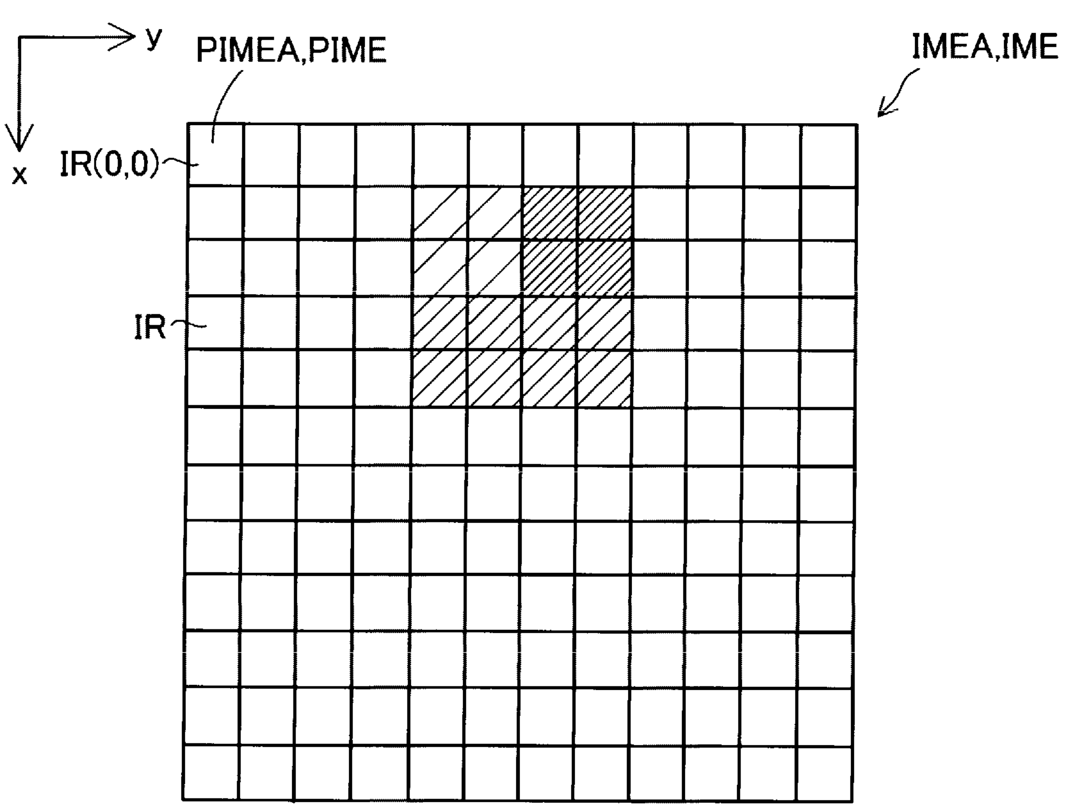
FIG. 12 is a first diagram for explaining an evidence image serving as a first evidence image.

FIG. 12 is a first diagram showing the evidence image IME serving as a first evidence image generated by the output-image generating section 244. The evidence image IME shown in FIG. 12 is an image generated according to the similarity degree by class in the first neuron layer 37. This image is referred to as first layer evidence image IMEA as well.

The first layer evidence image IMEA is formed by a plurality of partial evidence images PIMEA. The partial evidence image PIMEA corresponds to a neuron group located in the partial region R37, that is, a plane position (x, y). The output-image generating section 244 arrays the plurality of partial evidence images PIMEA in image regions IR corresponding to plane positions (x, y) of the partial regions R37 corresponding the plurality of partial evidence images PIMEA to generate a two-dimensional first layer evidence image IMEA. Each image region IR may be formed by one pixel or may be formed by a plurality of pixels. The output-image generating section 244 may perform correction processing of the partial evidence images PIMEA and generate the first layer evidence image IMEA to have the same resolution, that is, the size as the resolution, that is, the size of the second images 62. As the correction processing, there is, for example, first correction processing for enlarging, about a pre-correction image in which the plurality of partial evidence images PIMEA are two-dimensionally arrayed in the x direction and the y direction, a plane size to match a plane size of the second images 62 and generating the first layer evidence image IMEA. For example, as the correction processing, there is second correction processing for two-dimensionally arraying the partial evidence images PIMEA in the x direction and the y direction without enlarging the partial evidence images PIMEA to generate an image and, thereafter, enlarging an image generated by a bicubic method and generating the first layer evidence image IMEA. In the second correction processing using the bicubic method, since a change in a similarity degree can be made more smooth by interpolating pixels, the first layer evidence image IMEA can be represented by a more continuous change in a gradation value. Consequently, the user can roughly learn a region, which is discrimination evidence. As explained above, the output-image generating section 244 may perform the correction processing for associating the resolution of the first layer evidence image IMEA with the resolution of the second images 62. In this embodiment, a plurality of pixels are interpolated in one image region IR by the first correction processing to enlarge a 12×12 plane size in the first neuron layer 37 to form an image having a size of 32×32 pixels, which is an image size of the second images 62. In this embodiment, the same pixel values are given to the pixels of one image region IR. The image region IR corresponding to the partial region Rx specified by the plane position (x, y) is shown as image region IR(x, y).

The output-image generating section 244 generates the partial evidence images PIMEA using the similarity degrees by class calculated in the steps shown in FIG. 10 in the plurality of partial regions Rx specified by the plane positions. In this embodiment, the output-image generating section 244 generates the partial evidence image PIME such that a gradation value of an R component represented by 8 bits increases as the similarity degrees by class decrease. Gradation values of a G component and a B component are set to "0" or other fixed values. FIG. 12 indicates that the gradation value of the R component is larger as hatching is denser. In the first layer evidence image IMEA shown in FIG. 12, the similarity degrees by class are lower in regions slightly on the upper side than the center in the plane positions.

Figure 13:
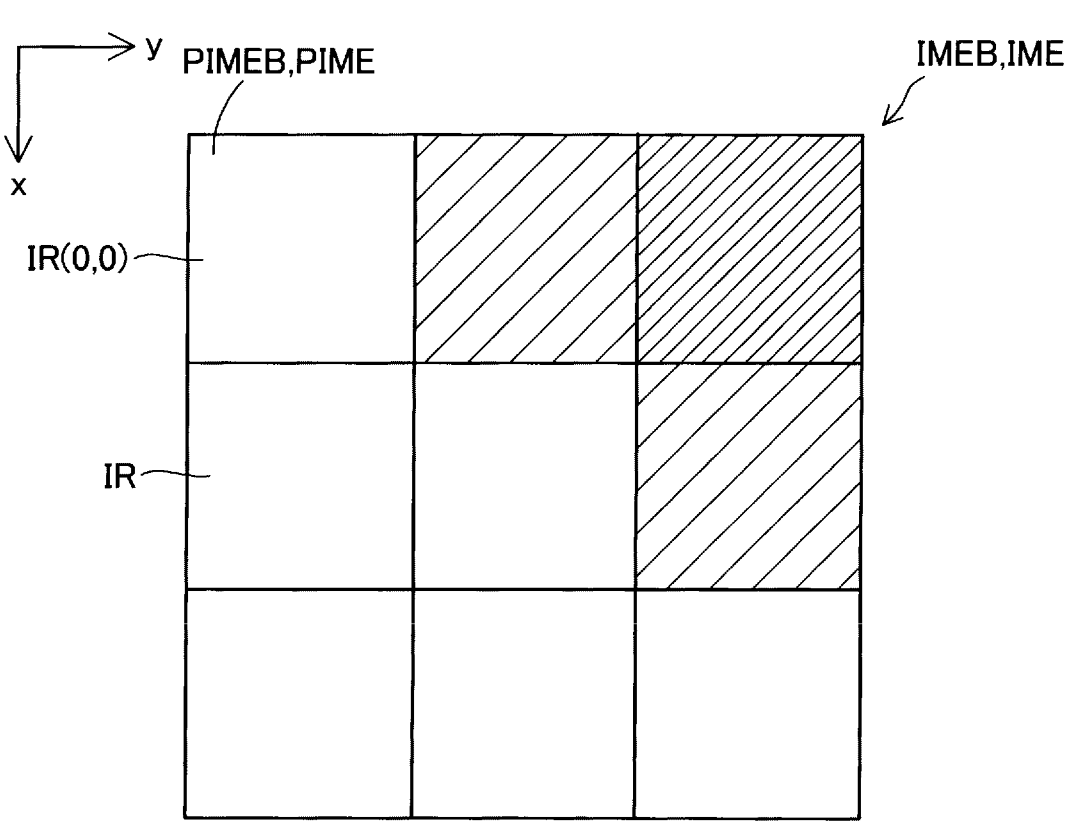
FIG. 13 is a second diagram for explaining the evidence image serving as the first evidence image.

FIG. 13 is a second diagram showing the evidence image IME serving as the first evidence image generated by the output-image generating section 244. The evidence image IME shown in FIG. 13 is an image generated according to a similarity degree by class in the second neuron layer 38. The image is referred to as second layer evidence image IMEB as well.

The second layer evidence image IMEB is formed by a plurality of partial evidence images PIMEB. The partial evidence images PIMEB correspond to the partial regions R38, that is, a neuron group located in the plane positions (x, y). The output-image generating section 244 arrays the plurality of partial evidence images PIMEB in the image regions IR corresponding to the plane positions (x, y) of the corresponding partial regions R38 to generate a two-dimensional second layer evidence image IMEB. Each image region IR may be formed by one pixel or may be formed by a plurality of pixels. The output-image generating section 244 may enlarge the partial evidence images PIMEB to have the same size as the size of the second images 62 and generate the second layer evidence image IMEB. That is, the output-image generating section 244 may perform correction processing for associating the resolution of the second layer evidence image IMEB with the resolution of the second images 62. Examples of the correction processing include a method of interpolating pixels using bicubic or giving the same pixel value to interpolate the pixels. In this embodiment, a plurality of pixels are interpolated in one image region IR to enlarge a 3×3 plane size in the second neuron layer 38 to form an image having a size of 32×32 pixels, which is an image size of the second image 62. In this embodiment, the same pixel value is given to the pixels of one image region IR. The image region IR corresponding to the partial region Rx specified by the plane position (x, y) is represented as an image region IR(x, y).

The output-image generating section 244 generates the partial evidence images PIMEB using the similarity degrees by class in the plurality of partial regions Rx specified in the plane positions calculated in the steps shown in FIG. 10. In this embodiment, the output-image generating section 244 generates the partial evidence images PIMEB such that a gradation value of an R component represented by 8 bits increases as the similarity degrees by class decrease. Gradation values of a G component and a B component are set to "0" or other fixed values. FIG. 13 indicates that the gradation value is larger as hatching is denser. In the second layer evidence image IMEB shown in FIG. 13, the similarity degree by class is low in an upper right region in the plane position.

As explained above, the output-image generating section 244 generates the two-dimensional evidence image IME. However, the output-image generating section 244 may generate an evidence image different from the above as long as the output-image generating section 244 generates the evidence image IME corresponding to a similarity degree. For example, in the other embodiments, the output-image generating section 244 may generate one-dimensional evidence images IME arrayed in one row or may generate evidence images IME arrayed three-dimensionally. The output-image generating section 244 may change, according to a similarity degree, at least one gradation value of RGB components to generate the partial evidence images PIME. The output-image generating section 244 may generate the partial evidence images PIME such that a different pattern is displayed according to a similarity degree, for example, such that a pattern with an interval of hatching changed is displayed. When the similarity degrees by class are lower than a predetermined threshold, the output-image generating section 244 may set gradation values for pixels forming the partial evidence images PIME such that a specific color appears in the partial evidence images PIME. The output-image generating section 244 may set gradation values for the pixels forming the partial evidence images PIME such that a color continuously changes as the similarity degrees by class decrease. For example, the output-image generating section 244 may set the gradation values such that the color darkens from white to red as the similarity degrees by class decrease.

Figure 14:
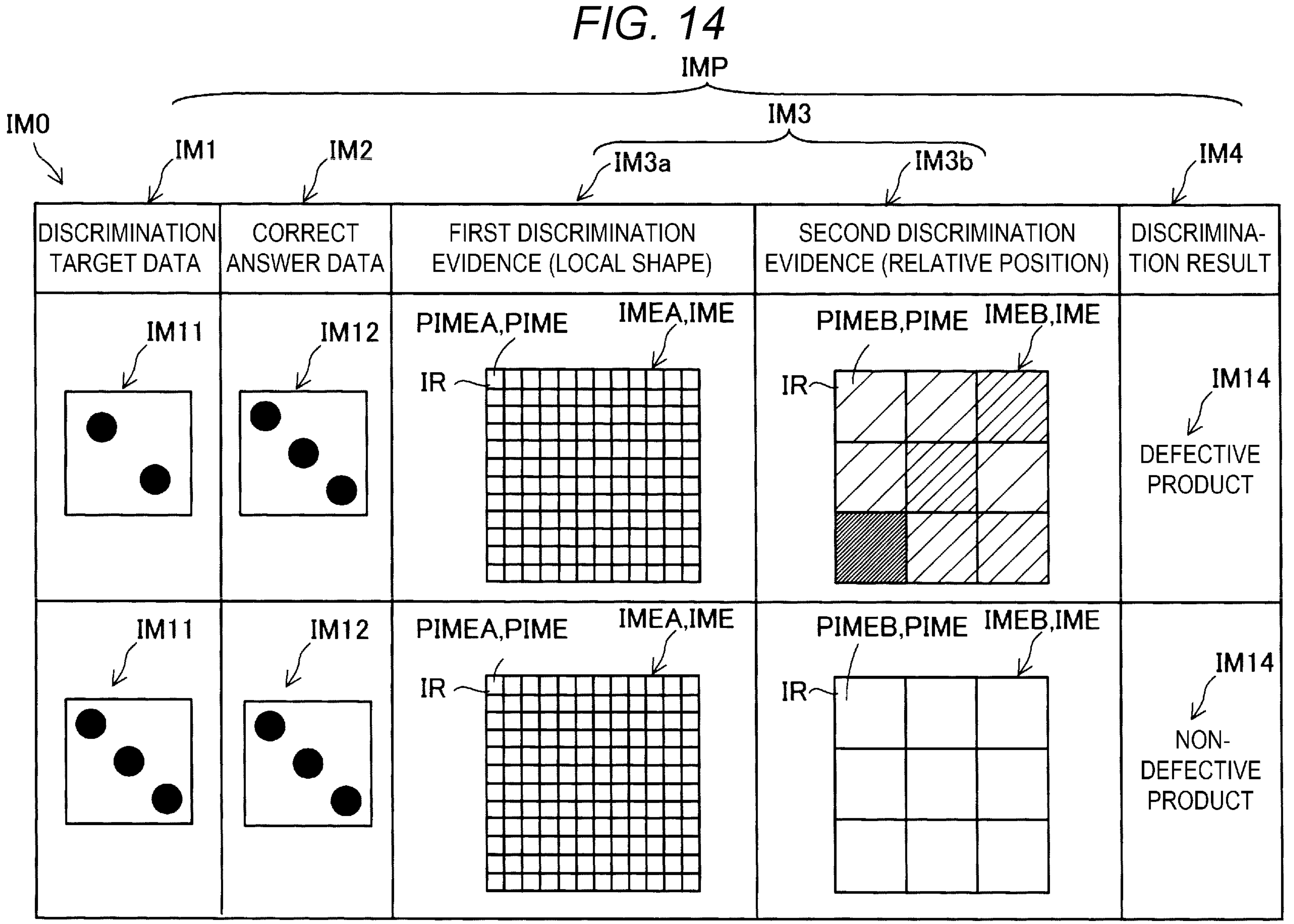
FIG. 14 is a schematic diagram showing an output image.

FIG. 14 is a schematic diagram showing the output image IMO generated by the output-image generating section 244. The output image IMO includes an explanation image IMP for explaining display content. The explanation image IMP includes a first explanation image IM1, a second explanation image IM2, a third explanation image IM3, and a fourth explanation image IM4.

The first explanation image IM1 is an image showing a field in which discrimination target data is displayed. In this embodiment, the first explanation image IM1 is a character image representing "discrimination target data". In a lower field of the first explanation image IM1, a discrimination target image IM11 showing the second images 62 explained below is displayed.

The second explanation image IM2 is illustrated in FIG. 14 for convenience of understanding of this embodiment. Specifically, one of a plurality of first data elements 12C used to generate comparison source data for comparing similarity degrees is illustrated such that the comparison source data is understood. In this embodiment, the second explanation image IM2 is not actually displayed on the display 26 but may be displayed in the other embodiments. The explanation of this paragraph is applicable to explanation of FIG. 17.

The third explanation image IM3 is an image showing layers in which similarity degrees are calculated. The third explanation image IM3 includes a first layer explanation image IM3*a* and a second layer explanation image IM3*b*. The first layer explanation image IM3*a* is an image indicating that the first layer evidence image IMEA generated according to the similarity degree in the first neuron layer 37 is displayed. In this embodiment, the first layer explanation image IM3*a* is a character image representing "first discrimination evidence (a local shape)". The second layer explanation image IM3*b* is an image indicating that the second layer evidence image IMEB generated according to the similarity degree in the second neuron layer 38 is displayed. In this embodiment, the second layer explanation image IM3*b* is a character image representing "second discrimination evidence (a relative position)".

The fourth explanation image IM4 is an image showing a field for displaying a label discrimination result. In this embodiment, the fourth explanation image IM4 is a character image representing a "discrimination result".

The output image IMO further includes a discrimination target image IM11, a comparison source image IM12, which is an image of the first data element 12C, which is a non-defective product, a first layer evidence image IMEA, a second layer evidence image IMEB, and a discrimination result image IM14. The discrimination result image IM14 is an image showing the class discrimination result generated in step S24 in FIG. 9. In FIG. 14, the discrimination result image IM14 is one of a character image representing a "non-defective product" and a character image representing a "defective product".

The discrimination target image IM11 is an image displayed in a lower field of the first explanation image IM1 and is an image showing the second image 62 of a label discrimination target. When a plurality of discrimination target second images 62 are present, a plurality of discrimination target images IM11 may be displayed or may be displayed one by one in other screens. In an example shown in FIG. 14, two discrimination target images IM11, that is, the discrimination target image IM11 of the second data element 62B representing two pips and the discrimination target image IM11 of the second data element 62C representing three pips are displayed.

The first layer evidence image IMEA is an image displayed in a lower field of the first layer explanation image IM3*a* and is the image shown in FIG. 12. The second layer evidence image IMEB is an image displayed in a lower field of the second layer explanation image IM3*b* and is the image shown in FIG. 13.

When the discrimination target data is an image of two pips, the similarity degrees by class of the partial regions R37 calculated in the first neuron layer 37 are high. Accordingly, in the first layer evidence image IMEA, a dark red region, in the figure, a hatched region is absent. On the other hand, when the discrimination target data is the image of two pips, the similarity degrees by class are low in the partial regions R38 corresponding to partial ranges of images in which relative positions of pips of dices are different in the second neuron layer 38. Accordingly, in the second layer evidence image IMEB, the partial evidence image PIMEB having a high gradation value of an R component is generated. Consequently, the user can visually learn, about the discrimination target image IM11, evidence indicating why the product is discriminated as a defective product by label discrimination.

On the other hand, when the discrimination target data is an image of three pips, similarity degrees by class of the partial regions R37 and R38 are high in both of the first neuron layer 37 and the second neuron layer 38. Accordingly, in both of the first layer evidence image IMEA and the second layer evidence image IMEB, a red region, in the figure, a hatched region is absent.

Since the similarity degree based on the first intermediate data and the second intermediate data is calculated as explained above, the processor 24 can generate the evidence image IME showing discrimination evidence according to the similarity degree and output the evidence image IME to the display 26. Consequently, the user can easily learn evidence of discrimination of the second data element 62 performed using the machine learning model 30. Since the similarity degree between the first intermediate data of the first partial data element and the second intermediate data of the second partial data element of the region corresponding to the first partial data element is calculated in the processing in step S36 in FIG. 10, a similarity degree between the first partial data element and the second partial data element can be calculated. Consequently, the output image IMO including the evidence image IME is displayed using the display 26. Therefore, for example, the user can easily learn which portion in the second data element is used as evidence to perform the discrimination of the label. Accordingly, the user can easily grasp discrimination evidence indicating, for example, which of the neuron layers 37, 38, and 39 is used as evidence for the discrimination of the label. That is, the user can grasp, from the output image IMO, about the second data elements 62A to 62C, which are the discrimination target data, a portion similar to a non-defective product, a portion not similar to the non-defective product, and the positions and the sizes of the portions. In the processing in step S36, targets of the calculation of a similarity degree may not be the first intermediate data and the second intermediate data from the partial regions Rx in the same relative positions in the neuron layers 37, 38, and 39. Even in such a case, since the output image IMO is output, the user can easily grasp information about which of the neuron layers 37, 38, and 39 is used as evidence about the discrimination of the label and which partial region Rx is used as evidence about the discrimination of the label.

Figure 15:
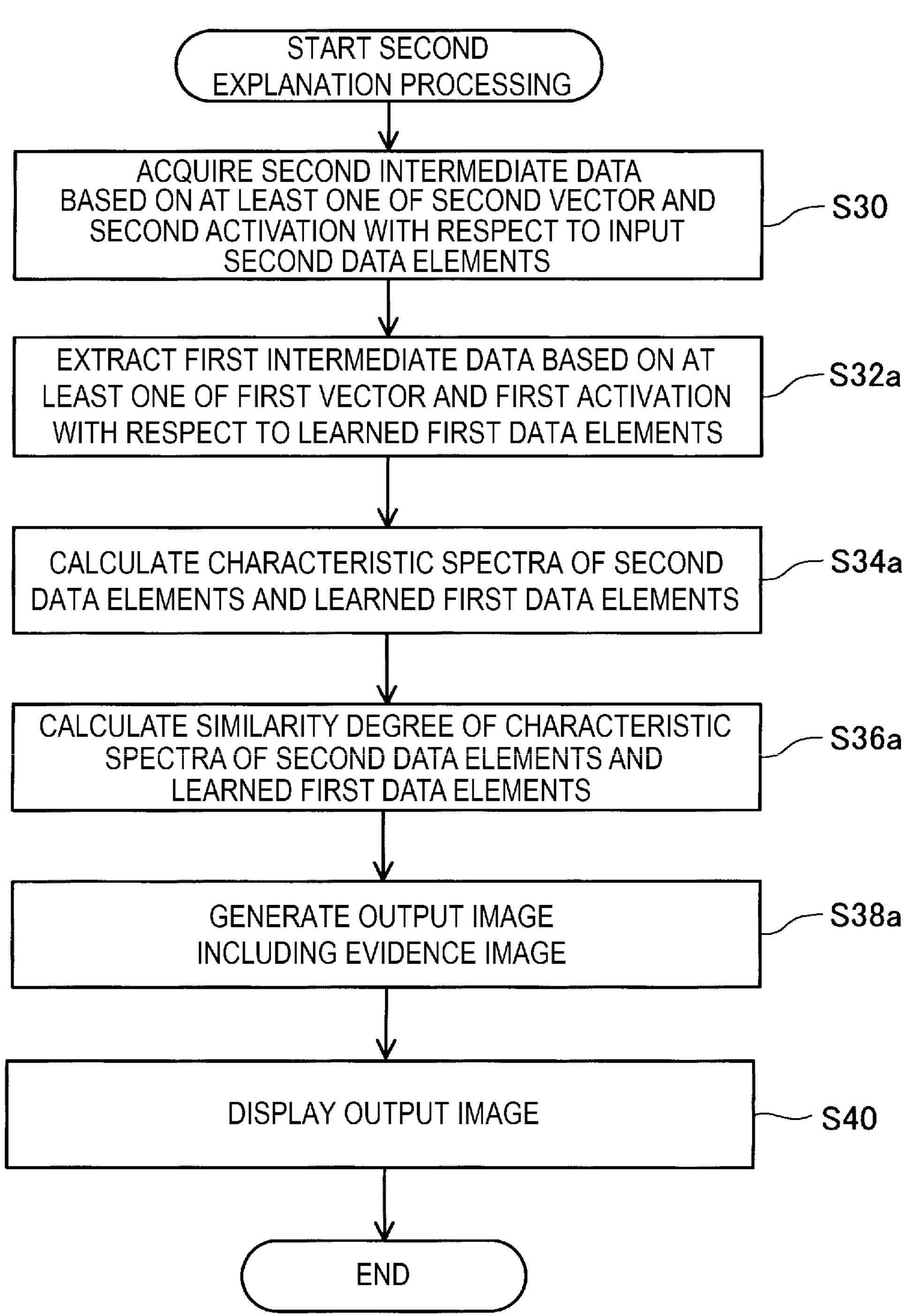
FIG. 15 is a flowchart of second explanation processing.
Figure 16:
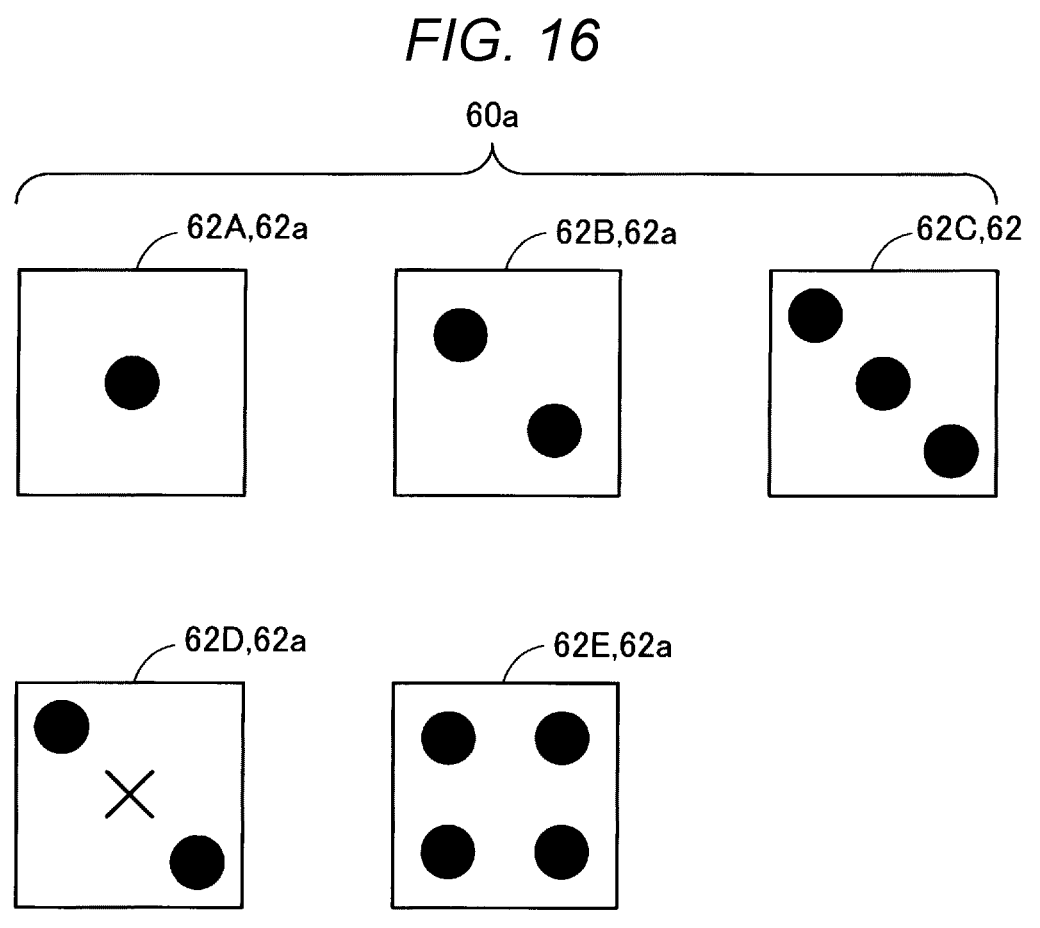

FIG. 15 is a flowchart of second explanation processing. The second explanation processing is executed by the processor 24. The second explanation processing is processing for discriminating whether the second data elements 62A to 62E are the same type as the known first data elements 12A to 12C used for the learning of the machine learning model 30 and explaining evidence of the discrimination. FIG. 16 is a diagram for explaining second images 62*a*. In short, the second explanation processing is considered to be processing for explaining whether unknown data is forcibly discriminated or discriminated as known data.

As shown in FIG. 16, the second images 62*a* include five types of second data elements 62A to 62E. The second data elements 62A, 62B, and 62C are respectively the same as the second data elements 62A, 62B, and 62C shown in FIG. 6 and are image data elements obtained by imaging a dice, which is a target object of the same type as the first data elements 12A to 12C used in the learning of the machine learning model 30. Specifically, the second data element 62D is an image obtained by imaging a dice, on the surfaces of which a center pip of three pips is a cross mark. The second data element 62E is an image obtained by imaging a dice, the surfaces of which have four pips. As explained above, the second data elements 62D and 62E are data elements of unknown types not used in the learning of the machine learning model 30. A size of the second data elements 62A to 62E is, for example, 32×32 pixels same as the size at the learning time of the machine learning model 30. 1100 each of the second data elements 62A to 62E are prepared. The position of a pip of the dice fluctuates by ±2 pixels at most and the size of the pip of the dice fluctuates by ±2 pixels at most. The prepared second data elements 62A to 62E are input to the learned machine learning model 30 one by one, whereby class discrimination is performed, that is, a label is discriminated.

As shown in FIG. 15, in step S30, the processor 24 inputs the second data elements 62A to 62E to the learned machine learning model 30 one by one and executes class discrimination about each of the second data elements 62A to 62E. The processor 24 acquires, from the machine learning model 30, second intermediate data for each of the second data elements 62A to 62E at the time when the class discrimination ends. Step S30 shown in FIG. 15 is the same processing as step S30 shown in FIG. 10. Subsequently, in step S32*a*, the processor 24 extracts all the first intermediate data of each of the first data elements 12A to 12C, which are used for the learning of the machine learning model 30, stored in the storage device 22.

Subsequently, in step S34*a*, the processor 24 calculates characteristic spectra of the second data elements 62A to 62E input to the machine learning model 30 and characteristic spectra Sp of the extracted first data elements 12A to 12C. Since a method of the calculation is the same as the method described in step S34 in FIG. 10, explanation about the method is omitted.

Subsequently, in step S36*a*, the similarity-degree calculating section 242 of the processor 24 calculates a similarity degree between the characteristic spectra Sp in the second intermediate data of the second data elements 62A to 62C and the characteristic spectra Sp in the first intermediate data of the first data elements 12A to 12C. As the similarity degree, for example, a cosine similarity degree is used. In step S36*a*, for each of the partial regions Rx of each of the first neuron layer 37, the second neuron layer 38, and the classification neuron layer 39, a value of the highest similarity degree to all of the first data elements 12A to 12C is set as a similarity degree of the partial region Rx. That is, the similarity degree calculated in step S36*a* represents a similarity degree of the discrimination target second image 62*a* to characteristics of the known first image 12 set as a comparison source. Accordingly, the similarity degree calculated in step S36*a* is referred to as known similarity degree as well. The similarity degree of the partial region Rx is stored in the storage device 22 in association with a partial range of an image to which the partial region Rx corresponds and the activation "a" of the partial region Rx.

Subsequently, in step S38*a*, the output-image generating section 244 of the processor 24 generates an output image IMOa including an evidence image IMEa corresponding to the calculated, that is, derived known similarity degree. Subsequently, in step S40*a*, the display 26 displays the generated output image IMOa to output the output image IMOa according to a command from the processor 24. A method of generating an evidence image is the same as step S38 of the first explanation processing and the content explained with reference to FIGS. 12 and 13. Therefore, explanation about the method is omitted.

Figure 17:
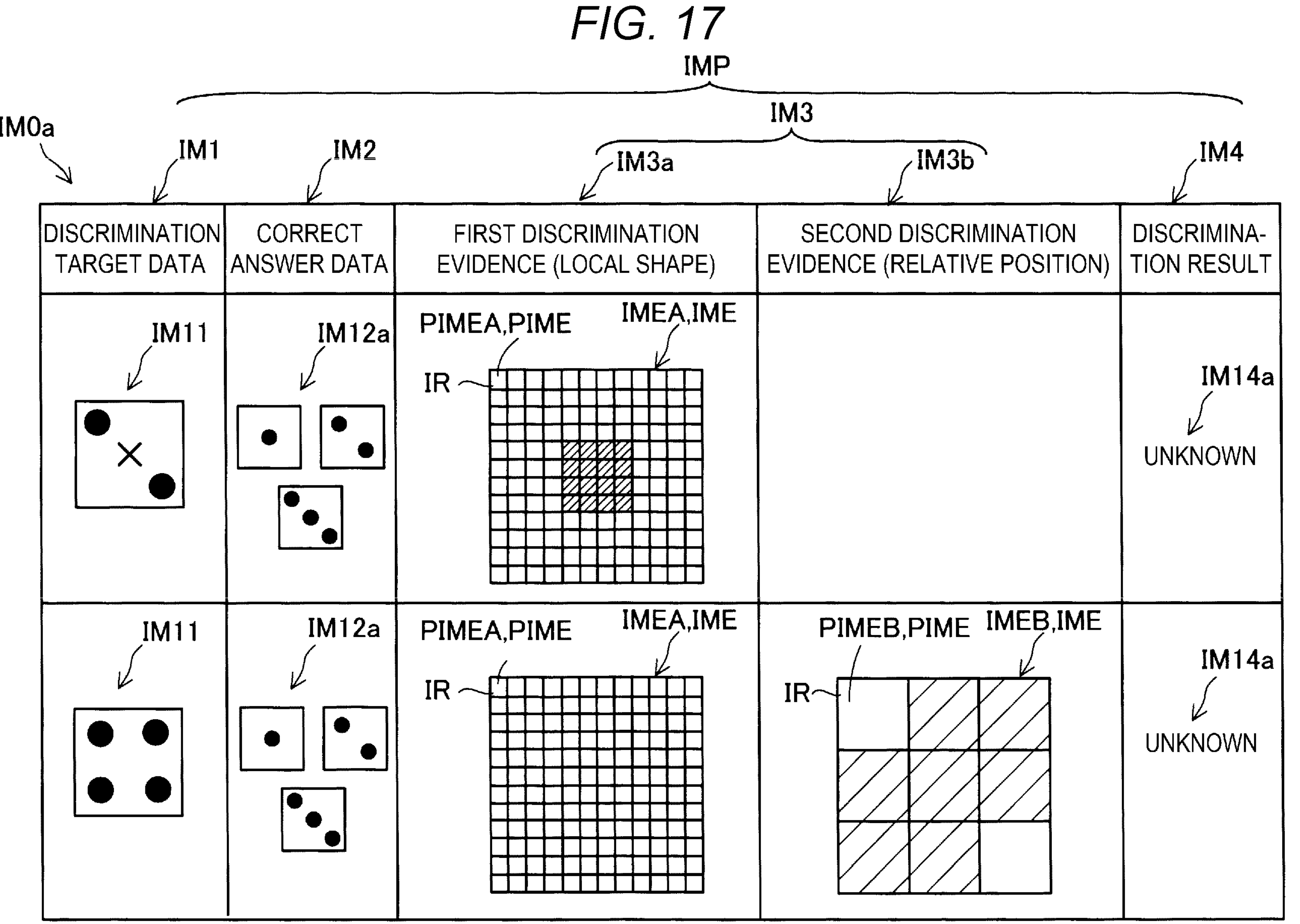
FIG. 17 is a schematic diagram showing an output image.

FIG. 17 is a schematic diagram showing the output image IMOa generated by the output-image generating section 244. The same components as the components of the output image IMO shown in FIG. 14 are denoted by the same reference signs and explanation of the components is omitted. A discrimination result image IM14*a* displayed in a lower field of the fourth explanation image IM4 is one of an image representing "known" indicating data of the same type as the data used in the learning of the machine learning model 30 and an image representing "unknown" indicating data of an unknown type. A comparison source image IM12*a* is an image representing the first data elements 12A to 12C used in the learning of the machine learning model 30. The displayed images are, in this embodiment, one each of the first data elements 12A, 12B, and 12C selected at random out of the plurality of first data elements 12A, 12B, and 12C.

When the discrimination target data is the second data element 62D shown in FIG. 16, the known similarity degree indicates a low value in the partial region R37 corresponding to a partial range in the center where a cross mark is displayed in the second data element 62D. Accordingly, a red image is displayed in the partial evidence image PIMEA located in the center region of the first layer evidence image IMEA corresponding to the partial range in the center of the second data element 62D. When the discrimination target data is the second data element 62D, class discrimination of "unknown" is decided based on a similarity degree in the first neuron layer 37. Accordingly, the output-image generating section 244 may not generate the partial evidence images PIMEB in a low order layer. Even when the class discrimination is decided by a high order layer, the output-image generating section 244 may generate the second layer evidence image IMEB indicating second discrimination evidence of the low order layer.

When the discrimination target data is the second data element 62E shown in FIG. 16, since the second data element 62E is an image of four pips, a local shape of the second data element 62E is similar to a local shape of the first data elements 12A to 12C, which are correct answer data. Therefore, the known similarity degree calculated by the similarity-degree calculating section 242 indicates a high value in the first neuron layer 37. Accordingly, the output-image generating section 244 generates the evidence image IME not including the partial evidence images PIMEA of red. On the other hand, in the second neuron layer 38 for comparing relative positions in the local shape and calculating a similarity degree, a known similarity degree of the partial region R38 corresponding to a partial range including an image of four pips is low. Accordingly, the second layer evidence image IMEB including the partial evidence images PIMEB of red is generated. In the second layer evidence image IMEB shown in FIG. 17, the partial evidence images PIMEB other than those at the upper left and the lower right are displayed in a gradation value indicating the same similarity degree, in this embodiment, the same red color.

As explained above, the second explanation processing achieves the same effects as the effects of the first explanation processing in that the second explanation processing has the same configuration as the configuration of the first explanation processing and performs the same processing as the processing of the first explanation processing. For example, since the similarity degree based on the first intermediate data and the second intermediate data is calculated, the processor 24 can generate and output the evidence image IME corresponding to the similarity degree. Consequently, the user can easily learn evidence of discrimination of the second data element 62 performed using the machine learning model 30.

According to the embodiment, since the evidence image IME corresponding to the similarity degree is generated and displayed in the first explanation processing and the second explanation processing, the user can easily learn discrimination evidence of the label discrimination performed using the machine learning model 30. According to the embodiment, since the gradation value is given to the pixels of the evidence image IME corresponding to the similarity degree, the user can easily learn discrimination evidence according to a difference in the gradation value. For example, in this embodiment, the user can easily learn that a dark red region in the evidence image IME is a region different from the correct answer data, that is, a region where the similarity degree is low.

B. Second Embodiment

Figure 18:
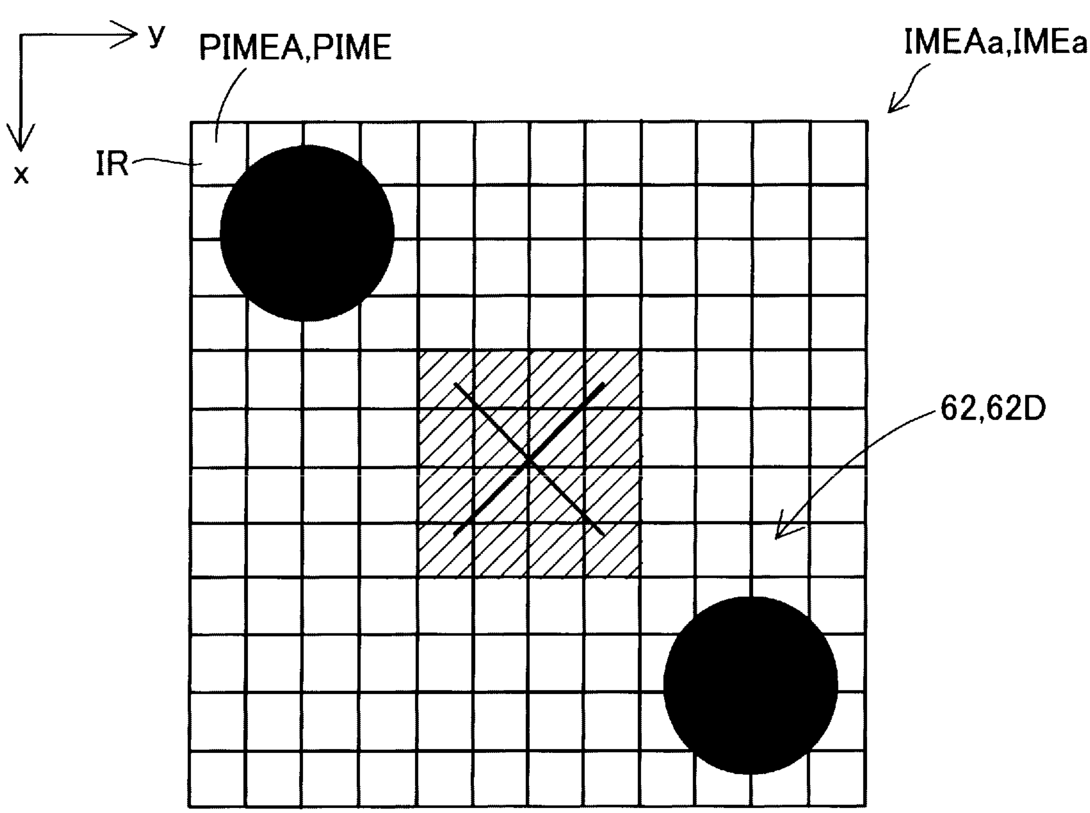
FIG. 18 is a diagram showing an evidence image.

FIG. 18 is a diagram showing the evidence image IMEa serving as a second evidence image in a second embodiment. A first layer evidence image IMEAa is shown in FIG. 18. However, the same applies to a second layer evidence image IMEBa. The output-image generating section 244 may generate the evidence image IMEa explained below instead of the evidence image IMEa in the first embodiment.

The evidence image IMEa serving as the second evidence image is formed by executing, with the output-image generating section 244, combination processing for combining the plurality of partial evidence images PIME explained in the first embodiment and the second image 62. For example, the output-image generating section 244 executes one combination processing of first combination processing and second combination processing explained in detail below to form the evidence image IMEa.

In the first combination processing, the output-image generating section 244 superimposes the plurality of partial evidence images PIME explained in the first embodiment on a corresponding region of the second image 62 to form the evidence image IMEa. That is, the output-image generating section 244 performs, about a pre-correction image in which the plurality of partial evidence images PIME are arrayed in two dimensions of an x direction and a y direction, the first correction processing explained above for matching a plane size of the pre-correction image to a plane size of the second image 62, which is discrimination target data, and generates a post-correction image. The output-image generating section 244 superimposes the post-correction image on the second image 62 to combine the post-correction image and the second image 62. The evidence image IMEa shown in FIG. 18 is formed by the first combination processing.

In the second combination processing, the output-image generating section 244 executes the following processing and forms the evidence image IMEa. First, the output-image generating section 244 acquires partial images of the second image 62 corresponding to each of a plurality of partial evidence images PIME and generates a plurality of partial superimposed images obtained by superimposing the partial evidence images PIME and partial images corresponding to the partial evidence images PIME. The output-image generating section 244 arrays the plurality of partial superimposed images in the two dimensions of the x direction and the y direction to form the evidence image IMEa. In the second combination processing, it is possible to superimpose the partial evidence images PIME and the partial images of the second image 62 considering a stride in the machine learning model 30. Consequently, it is possible to form the evidence image IMEa further reflecting a correspondence relation between the partial images of the second image 62 and the partial evidence images PIME.

In the combination processing explained above, for example, the output-image generating section 244 adds up a pixel value of the post-correction image and a pixel value of the second image 62 to perform an inter-image arithmetic operation to combine the images. For example, the output-image generating section 244 may set transmittance of each of the post-correction image and the second image 62 and performs the inter-image arithmetic operation to combine the images. In an example shown in FIG. 18, a similarity degree is low about the partial region Rx corresponding to a partial range where a cross mark is formed in the second image 62. Accordingly, the partial evidence images PIME corresponding to the partial range where the cross mark is formed in the second image 62 is displayed in red because a gradation value of an R component is set higher than a gradation value of the R component of the partial evidence images PIME in another plane position.

According to the second embodiment, the following effects are achieved in addition to the effects achieved by the first embodiment. The plurality of partial evidence images PIME are superimposed on the corresponding regions of the second image 62 to generate the second evidence image IMEa. Consequently, a user can intuitively learn discrimination evidence indicating which region of the second image 62 is a region where a similarity degree to correct answer data is low.

C. Third Embodiment

Figure 19:
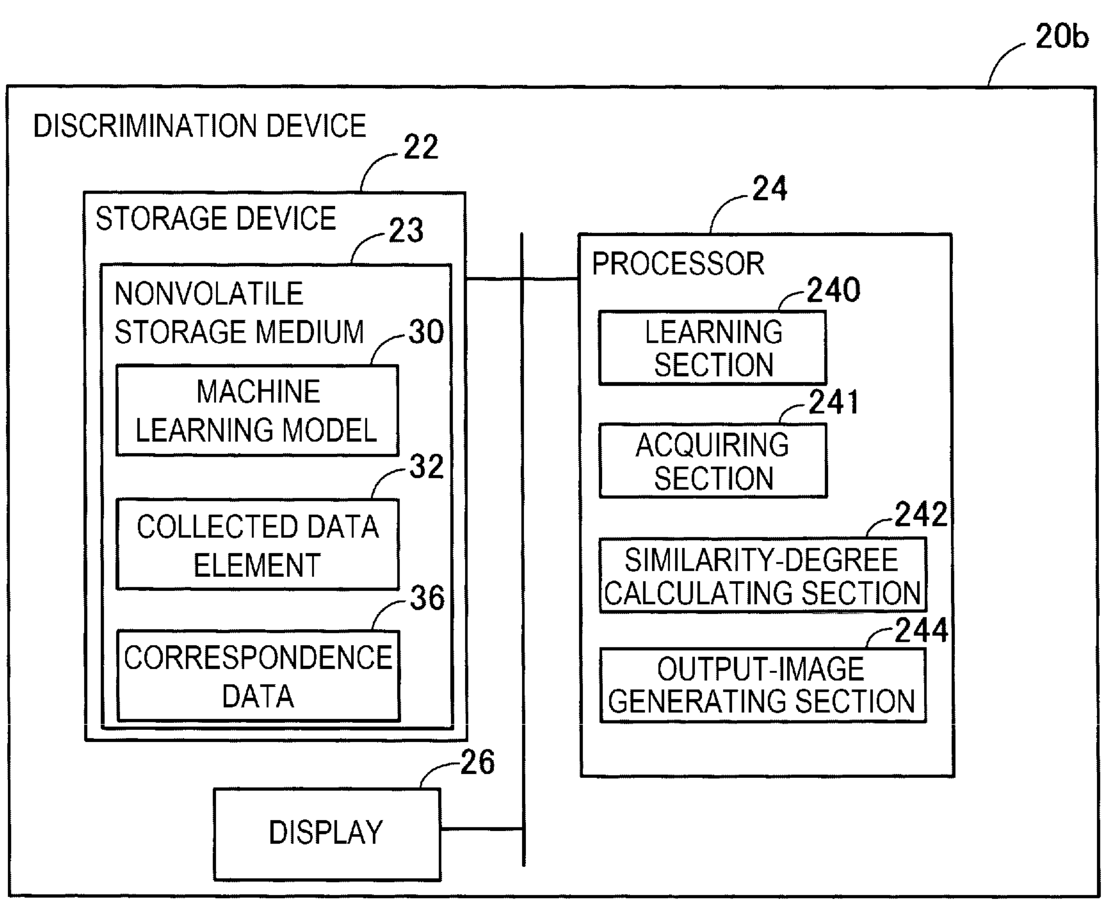
FIG. 19 is a diagram showing a discrimination device in a third embodiment.

FIG. 19 is a diagram showing a discrimination device 20*b* in a third embodiment. The discrimination device 20*b* is different from the discrimination device 20 in the first embodiment shown in FIG. 1 in that the discrimination device 20*b* has correspondence data 36 anew and in processing content of an output-image generating section 244*b*. The other components are the same as the components in the first embodiment. Therefore, the same components are denoted by the same reference numerals and signs and explanation of the components is omitted.

The storage device 22 of the discrimination device 20*b* stores the correspondence data 36 anew. The correspondence data 36 is data associating RGB color components and numbers of gradations of the color components used for forming the partial evidence images PIME and gradation values corresponding to similarity degrees. The RGB color components and the numbers of gradations of the color components are determined by an input from a user. The input from the user is explained below. The RGB color components and the numbers of gradations of the color components used to form the partial evidence images PIME function as representation parameters for representing the partial evidence images PIME.

The output-image generating section 244*b* generates the output images IMO and IMOa including the evidence images IME and IMEa according to a similarity degree calculated by the similarity-degree calculating section 242. Specifically, the output-image generating section 244*b* refers to the correspondence data 36 and gives gradation values corresponding to similarity degrees correlated with the representation parameters to pixels of the partial evidence images PIME.

Figure 20:
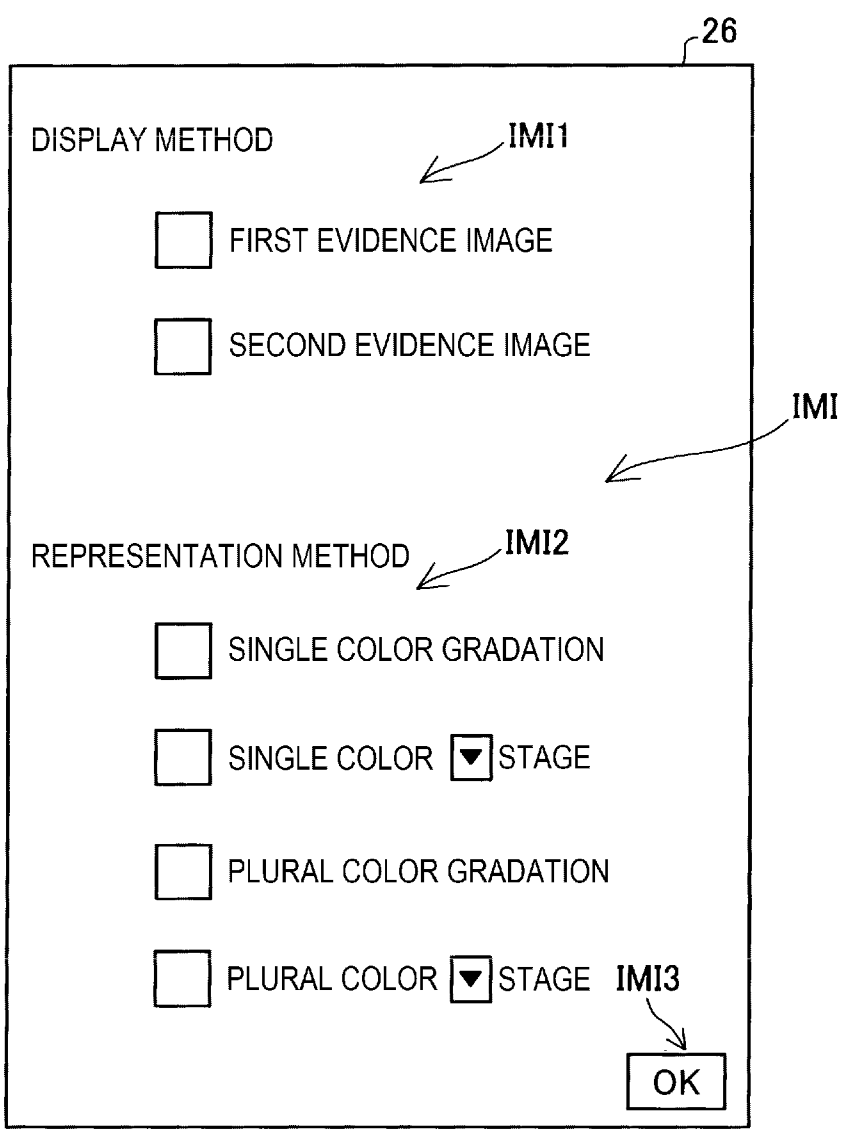
FIG. 20 is a diagram showing an input reception image.

FIG. 20 is a diagram showing an input reception image IMI for receiving inputs of various settings for generating the evidence images IME and IMEa. The input reception image IMI is displayed on, for example, the display 26. The input reception image IMI includes a first reception image IMI1, a second reception image IMI2, and a third reception image IMI3.

The first reception image IMI1 is an image for receiving an image generation instruction for causing the output-image generating section 244 to generate, as an evidence image, at least one image of the first evidence image IME shown in FIGS. 12 and 13 and the second evidence image IMEa shown in FIG. 18. The first reception image IMI1 includes checkbox images respectively corresponding to the first evidence image IME and the second evidence image IMEa. The user selects the checkbox image in a left field of the evidence image that the user desires to display as the evidence image.

The second reception image IMI2 is an image for receiving representation parameters of a partial evidence image. In an example shown in FIG. 20, the representation parameters of the partial evidence image are four parameters, that is, "single color gradation", "single color □ stage", "plural color gradation", and "plural color □ stage". The single color gradation is a representation method for continuously changing a gradation value of one color component according to similarity degrees. The plural color gradation is a representation method for continuously changing gradation values of three color components according to similarity degrees. The "single color □ stage" is a representation method for changing a gradation value of one color component stepwise according to similarity degrees. The same gradation value is given to similarity degrees having values in each fixed range. The "plural color □ stage" is a representation method for changing gradation values of three color components stepwise according to similarity degrees. In "□" of the second reception image IMI2, the number of gradations, which is the number of gradation values representing the partial evidence image PIME, can be selected by pulldown. The second reception image IMI2 includes checkbox images corresponding to the four representation parameters. The user selects a checkbox image to select one out of the four representation parameters. When the partial evidence image PIME is represented by a plurality of stages of gradation values, the user selects the number of gradations.

The third reception image IMI3 is an image for receiving, as an image generation instruction, content input to the first reception image IMI1 and the second reception image IMI2. The user selects the third reception image IMI3 with a cursor or the like, whereby the image generation instruction is received by the processor 24. The output-image generating section 244 of the processor 24 generates the evidence images IME and IMEa corresponding to the received image generation instruction. For example, the output-image generating section 244 gives, using the received representation parameters and the correspondence data 36, a gradation value of a color component corresponding to a similarity degree to pixels to generate the partial evidence images PIME.

According to the third embodiment, the same effects are achieved in that the third embodiment has the same configuration as the configuration in the first and second embodiments. According to the third embodiment, the user can cause, using the input reception image IMI, the display 26 to display the evidence images IME and IMEa in a display form such as a display method or a representation method of desired evidence images IME and MIEa.

D. Other Embodiments

D-1. Another Embodiment 1

In the embodiments, the machine learning model used in the embodiments is the machine learning model of the vector neural network type. However, the machine learning model is not limited to the machine learning model of the vector neural network type. The machine learning model is not limited to the above if the machine learning model is a machine learning model in which a vector neuron, an input and an output of which are vectors, is a neuron of a network.

For example, the machine learning model may be a machine learning model using a capsule network.

D-2. Another Embodiment 2

The characteristic spectra Sp for calculating a similarity degree is not limited to the embodiments. For example, the similarity-degree calculating section 242 may generate the characteristic spectra Sp by weighting the vectors M of the partial region Rx with a correction value obtained by applying the Softmax function to a value of the activation "a" or may generate the characteristic spectra Sp by arranging, with respect to elements in which the vectors M of the partial region Rx are rearranged in one dimension, values of the vectors M for each of the elements. That is, a calculation method for a similarity degree may be calculating a similarity degree between the characteristic spectra Sp of the first vector M1 and the characteristic spectra Sp of the second vector M2.

D-3. Another Embodiment 3

In the embodiments, the similarity degree between the characteristic spectra Sp of the first intermediate data and the characteristic spectra Sp of the second intermediate data is the cosine similarity degree. However, the similarity degree is not limited to the cosine similarity degree. Various similarity degrees may be used according to elements, similarity degrees of which are compared. For example, the similarity degree may be a square error. For example, the similarity degree may be a similarity degree based on an inner product or an outer product of two vectors or a similarity degree based on the distance, that is, the norm between two points represented by two vectors.

D-4. Another Embodiment 4

In the embodiment, the first explanation processing and the second explanation processing may be configured to be automatically switchable by the processor 24. For example, when executing the first explanation processing, the processor 24 may switch the first explanation processing to the second explanation processing when a ratio of discrimination of a defective product is equal to or larger than a predetermined value with respect to an overall number of input data elements.

D-5. Another Embodiment 5

In the embodiment, the program stored in the nonvolatile storage medium 23 is executed by one processor 24. However, the program may be executed by two or more processors 24.

D-6. Another Embodiment 6

The generation method for the first intermediate data and the second intermediate data is not limited to the embodiment. For example, the first intermediate data and the second intermediate data may be generated using a K means method. The first intermediate data and the second intermediate data may be generated using conversion such as PCA, ICA, or Fisher. Conversion methods for the first intermediate data and the second intermediate data may be different.

D-7. Another Embodiment 7

In the embodiments, the discrimination devices 20 and 20*b* are single devices. However, the discrimination devices 20 and 20*b* each may be configured by pluralities of devices. In this case, the pluralities of devices are configured to be capable of performing data communication by wire or radio.

E. Other Aspects

The present disclosure is not limited to the embodiments explained above and can be realized in various aspects not departing from the gist of the present disclosure. For example, the present disclosure can also be realized by the following aspects. Technical features in the embodiments corresponding to technical features in the aspects described below can be substituted or combined as appropriate in order to solve a part or all of the problems of the present disclosure or achieve a part or all of the effects of the present disclosure. Unless the technical feature are explained as essential technical features in this specification, the technical features can be deleted as appropriate.

(1) According to a first aspect of the present disclosure, there is provided a method of causing one or more processors to execute a method in which a machine learning model of a vector neural network type is used. The machine learning model is learned to reproduce correspondence between a plurality of first images and a pre-label corresponding to each of the plurality of first images. The machine learning model includes one or more neuron layers, each of the one or more neuron layers includes one or more neuron groups, and each of the one or more neuron groups includes one or more neurons. First intermediate data output by the one or more neurons when the plurality of first images are input to the learned machine learning model, the first intermediate data being based on at least one of a first vector and a first activation, is stored in one or more memories in correlation with the neurons. The method includes: inputting a second image of an object to the machine learning model and, about each of the one or more neuron layers, acquiring second intermediate data based on at least one of a second vector and a second activation included in the one or more neurons; calculating a similarity degree between the first intermediate data and the second intermediate data in the one or more neuron layers; generating an evidence image corresponding to the similarity degree; and displaying the generated evidence image. According to this aspect, since the evidence image corresponding to the similarity degree is generated and displayed, the user can easily learn evidence of discrimination.

(2) In the aspect, the generating the evidence image may include giving a gradation value corresponding to the similarity degree to pixels of the evidence image to generate the evidence image. According to this aspect, since the gradation value is given to the pixels of the evidence image corresponding to the similarity degree, the user can easily learn discrimination evidence according to a difference in the gradation value.

(3) In the aspect, the machine learning model may include a plurality of the neuron groups, the calculating the similarity degree may include calculating, about each of the plurality of neuron groups, a similarity degree between the first intermediate data and the second intermediate data, the generating the evidence image may include generating and arraying a plurality of partial evidence images corresponding to a calculated plurality of the similarity degrees to generate the evidence image, and the generated evidence image may be at least one of a first evidence image formed by the plurality of partial evidence images and a second evidence image formed by combining the plurality of partial evidence images and the second image. According to this aspect, the user can easily learn discrimination evidence according to at least one of the first evidence image and the second evidence image.

(4) In the aspect, the method may include receiving an image generation instruction for generating at least one of the first evidence image and the second evidence image, and the generating the evidence image may include generating the evidence image corresponding to the received image generation instruction. According to this aspect, the user can select the evidence image in a desired display form.

(5) In the aspect, correspondence data associating a color component and a number of gradations used to form the partial evidence images and a gradation value corresponding to the similarity degree may be stored in the one or more memories, the method may further include receiving representation parameters including the color component and the number of gradations used to generate the partial evidence images, and the generating the evidence image may include giving, using the received representation parameters and the correspondence data, the gradation value of the color component corresponding to the similarity degree to pixels of the partial evidence images to generate the partial evidence images. According to this aspect, the user can select the evidence image in a desired display form.

(6) According to a second aspect of the present disclosure, there is provided a device in which a machine learning model of a vector neural network type is used, the device including: one or more memories; and one or more processors. The one or more memories store (i) a machine learning model learned to reproduce correspondence between a plurality of first images and a pre-label corresponding to each of the plurality of first images, the machine learning model including one or more neuron layers, each of the one or more neuron layers including one or more neuron groups, each of the one or more neuron groups including one or more neurons, and (ii) first intermediate data output by the one or more neurons when the plurality of first images are input to the learned machine learning model, the first intermediate data being based on at least one of a first vector and a first activation, the first intermediate data being correlated with the neurons. The one or more processors are configured to execute: inputting a second image of an object to the machine learning model and, about each of the one or more neuron layers, acquiring second intermediate data based on at least one of a second vector and a second activation included in the one or more neurons; calculating a similarity degree between the first intermediate data and the second intermediate data in the one or more neuron layers; generating an evidence image corresponding to the similarity degree; and displaying the generated evidence image using a display. According to this aspect, since the evidence image corresponding to the similarity degree is generated and displayed, the user can easily learn evidence of discrimination.

(7) According to a third aspect of the present disclosure, there is provided a computer-readable non-transitory medium storing a program for causing one or more processors to execute a method in which a machine learning model of a vector neural network type is used. The machine learning model is learned to reproduce correspondence between a plurality of first images and a pre-label corresponding to each of the plurality of first images. The machine learning model includes one or more neuron layers, each of the one or more neuron layers includes one or more neuron groups, and each of the one or more neuron groups includes one or more neurons. One or more memories store, in correlation with the neurons, first intermediate data output by the one or more neurons when the plurality of first images are input to the learned machine learning model, the first intermediate data being based on at least one of a first vector and a first activation. The program causes the one or more processors to execute: inputting a second image of an object to the machine learning model and, about each of the one or more neuron layers, acquiring second intermediate data based on at least one of a second vector and a second activation included in the one or more neurons; calculating, in the one or more neuron layers, a similarity degree between the first intermediate data and the second intermediate data stored in the one or more memories; generating an evidence image corresponding to the similarity degree; and displaying the generated evidence image using a display. According to this aspect, since the evidence image corresponding to the similarity degree is generated and displayed, the user can easily learn evidence of discrimination.

Besides the aspects, the present disclosure can be realized in an aspect such as a computer-readable non-transitory tangible storage medium recording a computer program.

What is claimed is:

1. A method of causing one or more processors to execute a method in which a machine learning model of a vector neural network type is used, the vector neural network type being different from a capsule neural network and not requiring an iterative processing performed in the capsule neural network, the machine learning model being learned to reproduce correspondence between a plurality of first images and a pre-label corresponding to each of the plurality of first images, the machine learning model including one or more neuron layers, each of the one or more neuron layers including one or more neuron groups, each of the one or more neuron groups including one or more neurons, a first intermediate data output by the one or more neurons when the plurality of first images are input to the learned machine learning model, the first intermediate data being based on at least one of a first vector and a first activation, being stored in one or more memories in correlation with the neurons, the method comprising:

inputting a second image of an object to the machine learning model and, about each of the one or more neuron layers, acquiring a second intermediate data based on at least one of a second vector and a second activation included in the one or more neurons;

calculating a similarity degree between the first intermediate data and the second intermediate data in the one or more neuron layers;

generating a first-layer evidence image corresponding to the similarity degree computed in a first neuron layer of the one or more neuron layers;

generating a second-layer evidence image corresponding to the similarity degree computed in a second neuron layer of the one or more neuron layers; and displaying an output image that presents concurrently (i) the second image of the object, (ii) the generated first-layer and second-layer evidence images, and (iii) a text describing a binary discrimination result, wherein:

the displayed first-layer evidence image is a first matrix of partial evidence images arranged two-dimensionally, with a horizontal dimension and a vertical dimension of the first matrix corresponding to a horizontal dimension and a vertical dimension of an array of the neurons in the first neuron layer, the displayed first-layer evidence image represents local shape similarity between the first images and the second image of the object, the displayed second-layer evidence image is a second matrix of partial evidence images arranged two-dimensionally, with a horizontal dimension and a vertical dimension of the second matrix corresponding to a horizontal dimension and a vertical dimension of an array of the neurons in the second neuron layer, the displayed second-layer evidence image represents relative position of the local shapes between the first images and the second image of the object, the respective arrays of the neurons in the first and second neuron layers have different horizontal and vertical dimensions, a correction process is performed to match the dimensions of the first-layer evidence image and the second layer evidence image with the second image, and a gradation value of an R, G, or B component of each of the first-layer evidence image and the second-layer evidence image is set to increase as the respective similarity degrees represented by the first-layer evidence image and the second-layer evidence image decrease while gradation values of remaining two components of the R, G, and B components of each of the first-layer evidence image and the second-layer evidence image are set to fixed values, each of the first-layer evidence image and the second-layer evidence image includes changes in a pattern and/or an interval of a hatching, the output image is configured to show portions in the second image used to generate the binary discrimination result and corresponding positions and sizes of the portions using the changes in the pattern and/or the interval of the hatching.

2. The method according to claim 1, wherein the generating of the first-layer evidence image includes giving a gradation value corresponding to the similarity degree to pixels of the first-layer evidence image to generate the first-layer evidence image, and the generating of the second-layer evidence image includes giving a gradation value corresponding to the similarity degree to pixels of the second-layer evidence image to generate the second-layer evidence image.

3. The method according to claim 2, wherein the machine learning model includes a plurality of the neuron groups, the calculating of the similarity degree includes calculating, about each of the plurality of neuron groups, a similarity degree between the first intermediate data and the second intermediate data, the generating of the first-layer evidence image includes generating and arraying a plurality of partial evidence images corresponding to a calculated plurality of the similarity degrees to generate the first-layer evidence image, and the generated first-layer evidence image is at least one of a first evidence image formed by the plurality of partial evidence images and a second evidence image formed by combining the plurality of partial evidence images and the second image.

4. The method according to claim 3, further comprising receiving an image generation instruction for generating at least one of the first evidence image and the second evidence image, wherein the generating of the first-layer evidence image includes generating the evidence image corresponding to the received image generation instruction.

5. The method according to claim 3, wherein correspondence data associating a color component and a number of gradations used to form the partial evidence images and a gradation value corresponding to the similarity degree is stored in the one or more memories, the method further comprises receiving representation parameters including the color component and the number of gradations used to generate the partial evidence images, and the generating of the first-layer evidence image includes giving, using the received representation parameters and the correspondence data, the gradation value of the color component corresponding to the similarity degree to pixels of the partial evidence images to generate the partial evidence images.

6. A device in which a machine learning model of a vector neural network type is used, the vector neural network type being different from a capsule neural network and not requiring an iterative processing performed in the capsule neural network, the device comprising:

one or more memories; and one or more processors, wherein the one or more memories store (i) a machine learning model learned to reproduce correspondence between a plurality of first images and a pre-label corresponding to each of the plurality of first images, the machine learning model including one or more neuron layers, each of the one or more neuron layers including one or more neuron groups, each of the one or more neuron groups including one or more neurons, and (ii) a first intermediate data output by the one or more neurons when the plurality of first images are input to the learned machine learning model, the first intermediate data being based on at least one of a first vector and a first activation, the first intermediate data being correlated with the neurons, and the one or more processors are configured to execute:

inputting a second image of an object to the machine learning model and, about each of the one or more neuron layers, acquiring a second intermediate data based on at least one of a second vector and a second activation included in the one or more neurons;

calculating a similarity degree between the first intermediate data and the second intermediate data in the one or more neuron layers;

generating a first-layer evidence image corresponding to the similarity degree computed in a first neuron layer of the one or more neuron layers;

generating a second-layer evidence image corresponding to the similarity degree computed in a second neuron layer of the one or more neuron layers; and displaying, on a display, an output image that presents concurrently (i) the second image of the object, (ii) the generated first-layer and second-layer evidence images, and (iii) a text describing a binary discrimination result, wherein:

the displayed first-layer evidence image is a first matrix of partial evidence images arranged two-dimensionally, with a horizontal dimension and a vertical dimension of the first matrix corresponding to a horizontal dimension and a vertical dimension of an array of the neurons in the first neuron layer, the displayed first-layer evidence image represents local shape similarity between the first images and the second image of the object, the displayed second-layer evidence image is a second matrix of partial evidence images arranged two-dimensionally, with a horizontal dimension and a vertical dimension of the second matrix corresponding to a horizontal dimension and a vertical dimension of an array of the neurons in the second neuron layer, the displayed second-layer evidence image represents relative position of the local shapes between the first images and the second image of the object, the respective arrays of the neurons in the first and second neuron layers have different horizontal and vertical dimensions, a correction process is performed to match the dimensions of the first-layer evidence image and the second-layer evidence image with the second image, and a gradation value of an R, G, or B component of each of the first-layer evidence image and the second-layer evidence image is set to increase as the respective similarity degrees represented by the first-layer evidence image and the second-layer evidence image decrease while gradation values of remaining two components of the R, G, and B components of each of the first-layer evidence image and the second-layer evidence image are set to fixed values, each of the first-layer evidence image and the second-layer evidence image includes changes in a pattern and/or an interval of a hatching, the output image is configured to show portions in the second image used to generate the binary discrimination result and corresponding positions and sizes of the portions using the changes in the pattern and/or the interval of the hatching.

7. A non-transitory computer-readable medium storing a program for causing one or more processors to execute a method in which a machine learning model of a vector neural network type is used, the vector neural network type being different from a capsule neural network and not requiring an iterative processing performed in the capsule neural network, the machine learning model being learned to reproduce correspondence between a plurality of first images and a pre-label corresponding to each of the plurality of first images, the machine learning model including one or more neuron layers, each of the one or more neuron layers including one or more neuron groups, each of the one or more neuron groups including one or more neurons, one or more memories storing, in correlation with the neurons, a first intermediate data output by the one or more neurons when the plurality of first images are input to the learned machine learning model, the first intermediate data being based on at least one of a first vector and a first activation, the program causing the one or more processors to execute:

inputting a second image of an object to the machine learning model and, about each of the one or more neuron layers, acquiring a second intermediate data based on at least one of a second vector and a second activation included in the one or more neurons;

calculating, in the one or more neuron layers, a similarity degree between the first intermediate data and the second intermediate data stored in the one or more memories;

generating a first-layer evidence image corresponding to the similarity degree computed in a first neuron layer of the one or more neuron layers;

generating a second-layer evidence image corresponding to the similarity degree computed in a second neuron layer of the one or more neuron layers; and displaying, on a display, an output image that presents concurrently (i) the second image of the object, (ii) the generated first-layer and second-layer evidence images, and (iii) a text describing a binary discrimination result, wherein:

the displayed first-layer evidence image is a first matrix of partial evidence images arranged two-dimensionally, with a horizontal dimension and a vertical dimension of the first matrix corresponding to a horizontal dimension and a vertical dimension of an array of the neurons in the first neuron layer, the displayed first-layer evidence image represents local shape similarity between the first images and the second image of the object, the displayed second-layer evidence image is a second matrix of partial evidence images arranged two-dimensionally, with a horizontal dimension and a vertical dimension of the second matrix corresponding to a horizontal dimension and a vertical dimension of an array of the neurons in the second neuron layer, the displayed second-layer evidence image represents relative position of the local shapes between the first images and the second image of the object, the respective arrays of the neurons in the first and second neuron layers have different horizontal and vertical dimensions, a correction process is performed to match the dimensions of the first-layer evidence image and the second-layer evidence image with the second image, and a gradation value of an R, G, or B component of each of the first-layer evidence image and the second-layer evidence image is set to increase as the respective similarity degrees represented by the first-layer evidence image and the second-layer evidence image decrease while gradation values of remaining two components of the R, G, and B components of each of the first-layer evidence image and the second-layer evidence image are set to fixed values, each of the first-layer evidence image and the second-layer evidence image includes changes in a pattern and/or an interval of a hatching, the output image is configured to show portions in the second image used to generate the binary discrimination result and corresponding positions and sizes of the portions using the changes in the pattern and/or the interval of the hatching.

* * * * *